(12) United States Patent
Shoshan et al.

(10) Patent No.: US 9,225,816 B2
(45) Date of Patent: Dec. 29, 2015

(54) WIRELESS DEVICE SYSTEM—ARCHITECTURE

(75) Inventors: Yaakov Shoshan, Ashkelon (IL); Gil Koifman, Petach-Tikva (IL)

(73) Assignee: ELTA SYSTEMS LTD, Ashdod (IL)

( * ) Notice: Subject to any disclaimer, the term of this patent is extended or adjusted under 35 U.S.C. 154(b) by 223 days.

(21) Appl. No.: 13/989,537

(22) PCT Filed: Nov. 23, 2011

(86) PCT No.: PCT/IL2011/050025
§ 371 (c)(1),
(2), (4) Date: Nov. 7, 2013

(87) PCT Pub. No.: WO2012/070047
PCT Pub. Date: May 31, 2012

(65) Prior Publication Data
US 2014/0051372 A1    Feb. 20, 2014

Related U.S. Application Data

(60) Provisional application No. 61/450,186, filed on Mar. 8, 2011, provisional application No. 61/417,034, filed on Nov. 24, 2010.

(51) Int. Cl.
| | | |
|---|---|---|
| H04B 1/38 | (2015.01) | |
| H04M 1/00 | (2006.01) | |
| H04M 1/725 | (2006.01) | |
| H04W 88/06 | (2009.01) | |

(52) U.S. Cl.
CPC .......... *H04M 1/725* (2013.01); *H04M 1/72519* (2013.01); *H04M 1/72522* (2013.01); *H04W 88/06* (2013.01)

(58) Field of Classification Search
CPC .............. H04M 1/72519; H04M 1/72547; H04M 1/72561; H04M 1/7258; H04M 1/72583; H04M 1/72522; H04M 2250/06; H04M 2250/22; H04M 2250/62; H04N 1/00307; H04N 13/02; H04N 5/2252; H04B 1/38; H04B 1/3805
USPC ........... 455/90.2, 90.3, 550.1, 556.1; 375/219
See application file for complete search history.

(56) References Cited

U.S. PATENT DOCUMENTS

| | | | |
|---|---|---|---|
| 6,427,002 B2* | 7/2002 | Campbell et al. | ......... 379/88.01 |
| 8,036,363 B2* | 10/2011 | Sakaniwa | ..................... 455/461 |
| 2007/0275737 A1 | 11/2007 | Sakaniwa | |
| 2008/0072014 A1 | 3/2008 | Krishnan et al. | |
| 2008/0212568 A1* | 9/2008 | So et al. | ....................... 370/352 |

FOREIGN PATENT DOCUMENTS

WO    2004/021684 A1    3/2004

* cited by examiner

*Primary Examiner* — Quochien B Vuong
(74) *Attorney, Agent, or Firm* — Oliff PLC

(57) ABSTRACT

A wireless device system-architecture and wireless device includes functional layers each including one or more respective layer elements where the functional layers are operatively connected and ordered as a cascade of functional layers for data-transfer from one layer to its one or more adjacent functional layers. The architecture further includes one or more matrix-switches, each operatively connected between each two functional layers in the cascade of functional layers. A matrix-switch controller is operable to determine at least two processing routes for data-transfer from at least one layer element in one functional layer, to at least one layer element in a second functional layer, wherein each of the at least two processing routes is associated with a different application processor layer element and wherein data is being transmitted via the at least two processing routes, in the same direction, substantially at the same time.

35 Claims, 23 Drawing Sheets

WIRELESS DEVICE SYSTEM—ARCHITECTURE

FIELD OF THE INVENTION

This invention relates to wireless devices and wireless device system-architectures.

BACKGROUND OF THE INVENTION

Common system architecture of wireless communication devices (e.g. cellular devices such as cell phone, a wireless router, relay, bridge etc.) includes a number of functional layers (referred herein also as "layers") connected in series in a predefined order and operable for enabling incoming and outgoing communication of data with the devices. The wireless communication device can be operable to communicate in accordance to any one or more communication protocols including for example, 2G, 3G, 4G, WiF, WiMax, BlueTooth, and NFC. Each functional layer comprises of one or more layer elements (referred herein also as "element") which are used for processing and transmission of different types of data signals. Data is transferred from one end to the other end of the sequence of functional layers (and vice versa) while the functional elements, in each layer, operate in a cascade of processing steps where each layer transfers the data into a form suitable to be utilized by an adjacent layer (or to be transmitted from the device).

The functional layers commonly include an RF front-end layer, a modem layer, an application processor layer and appliances layer. RF front-ends are configured in general, for receiving data signals and their initial processing, and for performing the final processing and transmission of outgoing data signals. Different RF front-end layer elements are configured for dealing with different types of data signals. For example a cellular device may employ a first RF front-end element for receiving and transmitting second generation (2G) cellular communicant data-signals and a second RF front-end element for receiving and transmitting third generation (3G) cellular communication data-signals. A modem element is configured for processing incoming and outgoing data signals (e.g. modulating and demodulating) and communicating data from the RF front-end element to an application processor element and vice versa. Like the RF front end-units different modems can also be configured to process different types of data-signals, depending for example, on the type of communication protocol of the transmitted data. Modems are connected to an application processor configured for processing information received from the modem and transferring it in a desired form to an appropriate appliance (such as keyboard, display, microphone, speaker, etc) in the appliance layer, and also for receiving data from the appliance layer to be processed and transferred in the other direction.

Attention is drawn to FIG. 1 illustrating schematically a prior art mobile telephone system architecture 100. As shown the system 100 includes two RF end-units 101 and 102 and associated modems 103 and 104 both coupled to application processor 105, which is in turn coupled to plurality appliances. Depending on various criteria, such as the appliance selected by the user and the required communication constraints (e.g. 3G or 2G communication standards) the application processor 105 communicates with the appropriate modem and the appropriate appliance.

Prior art references considered to be relevant as background to the invention are listed below. Acknowledgement of the references herein is not to be inferred as meaning that these are in any way relevant to the patentability of the invention disclosed herein.

The use of more than one application processor has been previously described in the art. For example, US Patent Application No. 20080072014 discloses a mobile computing device with multiple modes, for example, wireless communication and personal computing, has an application processor and a communication processor. In the computing mode, the application processor is the master processor. In the communication mode, the application processor is de-energized to conserve battery power, with the communication processor functioning as the master processor by accessing the device's peripheral bus using the memory interface of the communication processor.

However, there is a need in the art for a new wireless device architecture and apparatus which is characterized by greater flexibility and enables to enhance the speed, efficiency and sensitivity of a wireless device operation.

SUMMARY OF THE INVENTION

According to one aspect of the presently disclosed subject matter there is provided a wireless device, comprising: a plurality of functional layers each of the functional layers comprising one or more respective layer elements, wherein the functional layers include at least an application processor functional layer and wherein the application processor functional layer comprises a plurality layer elements;

one or more matrix-switches, each matrix-switch operable to connect between a pair of functional layers and facilitate the connection of the plurality of functional layers in a cascade of functional layers to enable data-transfer from one functional layer to one or more other functional layers;

a matrix-switch controller operatively connected to the one or more matrix-switches and operable to control the one or more matrix-switches and determine at least two processing route for data-transfer from at least one layer element in one functional layer, to at least one layer element in a second functional layer, wherein each of the at least two processing routes is associated with a different application processor layer element and wherein data is being transmitted via the at least two processing routes, in the same direction, substantially at the same time.

According to certain embodiments of the presently disclosed subject matter, the matrix-switch controller is operable to determine a specific combination of connections between a layer element in one functional layer and one or more layer elements of an adjacent functional layers and instruct a matrix-switch located between the functional layer and the adjacent functional layer to facilitate the connections and thereby create the processing routes.

According to certain embodiments of the presently disclosed subject matter, at least one of the matrix-switches comprise a management module operable to determine a specific combination of connections between a layer element in one functional layer and one or more layer elements of an adjacent functional layers.

According to certain embodiments of the presently disclosed subject matter, the matrix-switch controller is operable to determined in at least one of the at least two processing routes a layer element which is connected in series to at least one other layer element of the same functional layer.

According to certain embodiments of the presently disclosed subject matter, one or more of the matrix-switches comprises a synchronizer operable to synchronize the transmission of data from one functional layer element to a plurality of other functional layer elements.

According to certain embodiments of the presently disclosed subject matter, one or more of the matrix-switch further comprises a data-repository and framer;

the data-repository is configured to temporarily store transmitted and the framer is configure to group the stored data into groups of data; the synchronizer is configured to synchronize the transmission of the groups of data.

According to certain embodiments of the presently disclosed subject matter, one or more of the matrix-switches comprises a protocol hub module configured to adapt data communication in a give communication protocol for transmission to multiple functional layer elements substantially at the same time.

According to another aspect of the presently disclosed subject matter there is provided a wireless device, comprising: a plurality of functional layers each of the functional layers comprising one or more respective layer elements, wherein the functional layers include at least an application processor functional layer and wherein the application processor functional layer comprises a plurality layer elements; one or more matrix-switches, each matrix-switch operable to connect between a pair of functional layers and facilitate the connection of the plurality of functional layers in a cascade of functional layers to enable data-transfer from one functional layer to one or more other functional layers; a matrix-switch controller operatively connected to the one or more matrix-switches; the matrix-switch controller is operable to control the one or more matrix-switches and determine at least one processing route for data-transfer from at least one layer element in one functional layer, to at least one layer element in a second functional layer, wherein the at least one processing routes connects in series at least two layer elements of the same functional layers.

According to certain embodiments of the presently disclosed subject matter, the matrix-switch controller is operable to determine at least two processing route for data-transfer from at least one layer element in one functional layer, to at least one layer element in a second functional layer, wherein each of the at least two processing routes is associated with a different application processor layer element and wherein data is being transmitted via the at least two processing routes, in the same direction, substantially at the same time.

According to another aspect of the presently disclosed subject matter there is provided a wireless device resource manager unit being operatively connectable to a wireless device the device comprising a plurality of functional layers each of the functional layers comprising one or more respective layer elements, wherein the functional layers include at least an application processor functional layer and wherein the application processor functional layer comprises a plurality layer elements; the wireless device resource manager unit comprising: one or more matrix-switches, each matrix-switch operable to connect between a pair of functional layers and facilitate the connection of the plurality of functional layers in a cascade of functional layers to enable data-transfer from one functional layer to one or more other functional layers; a matrix-switch controller operatively connected to the one or more matrix-switches; the matrix-switch controller is operable to control the one or more matrix-switches and determine at least one processing route for data-transfer from at least one layer element in one functional layer, to at least one layer element in a second functional layer, wherein the at least one processing route connects in series at least two layer elements of the same functional layers.

According to another aspect of the presently disclosed subject matter there is provided, a method of transmitting data in a wireless device comprising a plurality of functional layers each of the functional layers comprising one or more respective layer elements, wherein the functional layers include at least an application processor functional layer comprising a plurality of layer elements; the method comprises:

receiving data at one or more terminal layer elements in a terminal functional layer; selecting one or more layer elements in other functional layers including at least two application processor layer elements in the application processor layer; determining at least two processing routes wherein each processing route comprises at least one layer element from each functional layer and a different application processor; transmitting data via the at least two processing routes substantially at the same time, in the same direction.

According to certain embodiments of the presently disclosed subject matter, the method further comprising: determining at least one processing route which comprises at least two application processes connected in series.

According to an aspect of the presently disclosed subject matter there is provided a method of transmitting data in a wireless device comprising a plurality of functional layers each of the functional layers comprising one or more respective layer elements, wherein the functional layers include at least an application processor functional layer comprising a plurality of layer elements; the method comprises:

receiving data at one or more terminal layer elements in a terminal functional layer; selecting one or more layer elements in other functional layers including at least two application processor layer elements in the application processor layer; determining at least one processing route which comprises at least one layer element from each functional layer and at least two application processors connected in series.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
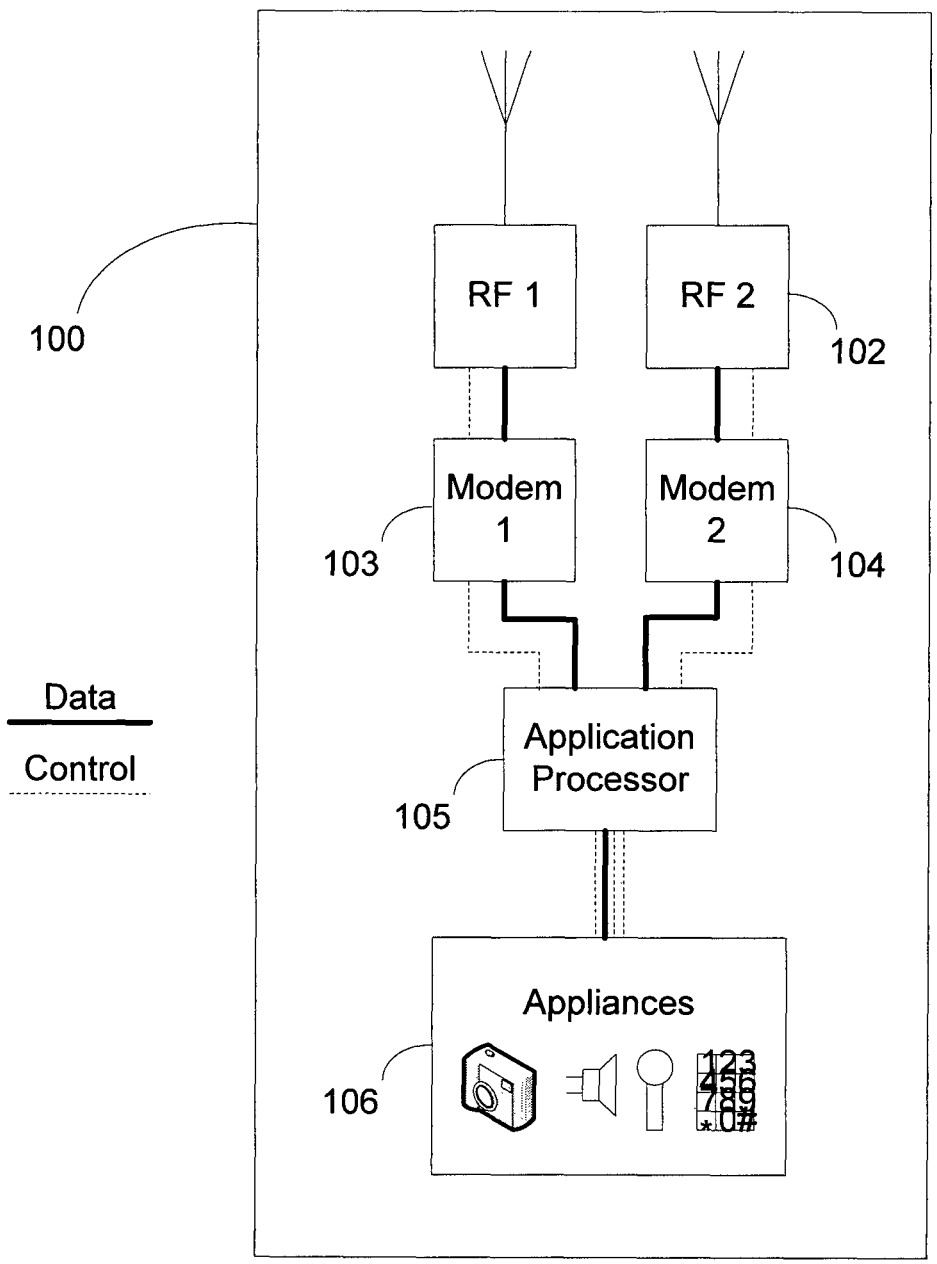
FIG. 1 illustrate schematically prior art mobile telephone system architecture 100.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "selecting", "determining", "creating", "establishing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium. As used herein, the phrase "for example," "such as", "for instance" and variants thereof describe non-limiting embodiments of the present invention. Reference in the specification to "one implementation", "some implementations", "certain implementations", "other implementations", "another implementations", "one embodiment", "an embodiment", "some embodiments", "another embodiment", "other embodiments", "certain embodiments", "one instance", "some instances", "one case", "some cases", "other cases" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments", "one instance", "some instances", "one case", "some cases", "other cases" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Note that the description below refers in general to wireless devices. Typical, yet not exclusive, examples of wireless devices are mobile telephone, laptop dongle facilitating access of laptop to cellular network, laptop connectible to cellular networks and/or any device that can form part of a cellular network.

The term "application processor" used herein refers to a processor configured to run any desired application such as by way of specific example bank related applications, video conferencing, Internet browsing, video conference, firewall and/or any other desired application. The term "processor" as used herein refers to any type of processors including for example, a hardware processor or microprocessor, a software processor programmed on a programmable circuit board FPGA), application-specific integrated circuit (ASIC), a virtual processor. The term "processor" should not be limited to a single processor alone but rather to any known architecture of processor whether single or multi, parallel distributed and or any other known architecture.

The description below is provided with reference to system architectures and functional blocks illustrated in FIGS. 2-18. However, the disclosed subject matter is not bound by the specific architecture, equivalent and/or modified functionality may be consolidated or divided in another manner and may be implemented in any appropriate combination of software, firmware and hardware.

Figure 2:
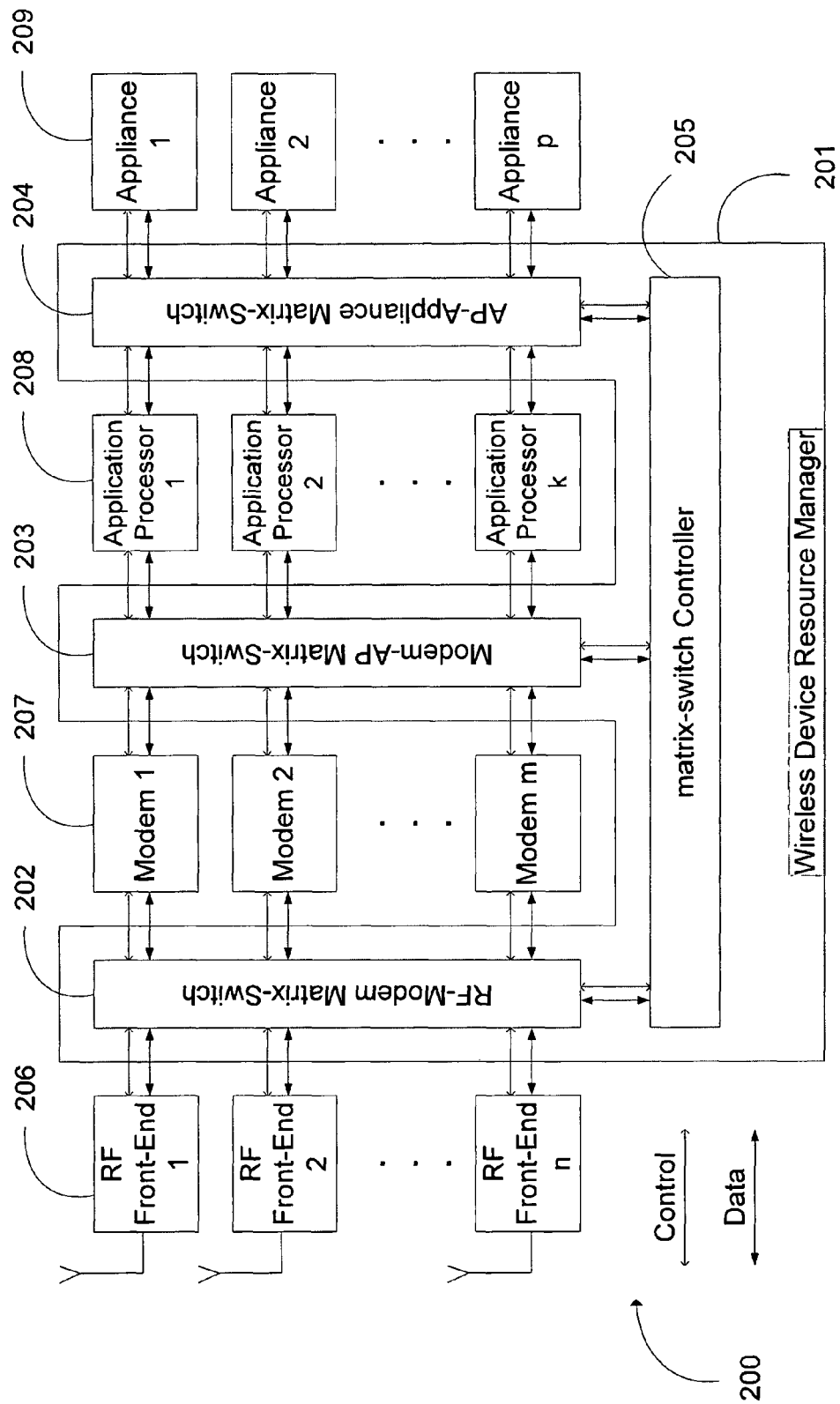
FIG. 2 is a functional block diagram schematically illustrating a wireless device system-architecture, according to the presently disclosed subject matter.

Bearing the above in mind attention is now drawn to FIG. 2 showing a functional block diagram schematically illustrating a wireless device system-architecture, according to the presently disclosed subject matter. As shown, system 200 includes a plurality of functional layers including RF front-end layer 206, Modem layer 207, Application processor layer 208, and Appliance layer 209. Each functional layer comprises an array of one or more layer elements (numbered from 1 to n) where the number of layer elements in each layer may vary from one layer to the other and from one device to another.

Figure 11:
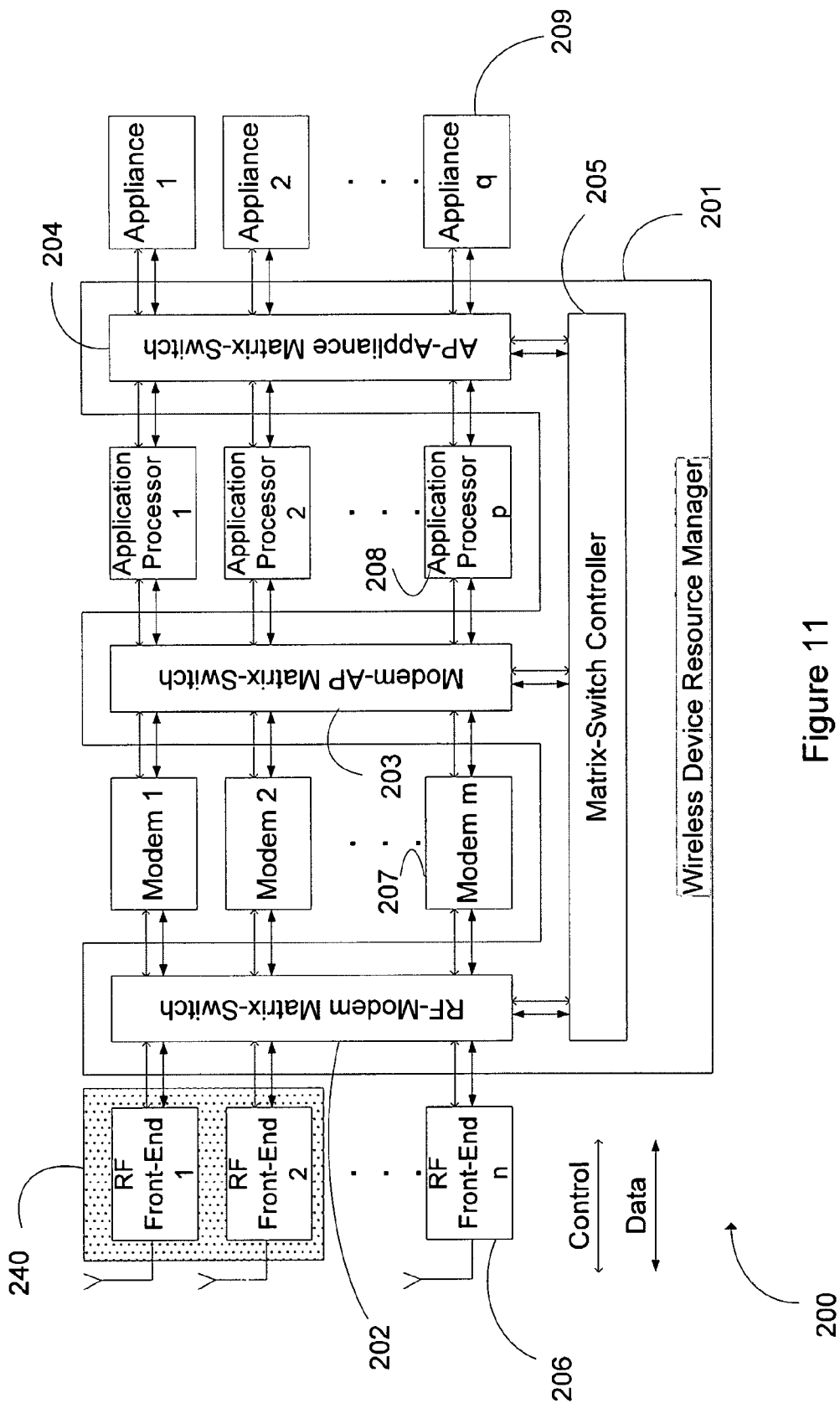
FIG. 11 is a functional block diagram schematically illustrating a wireless device system-architecture, exemplifying two RF front-end layer elements configured as a single unit, according to the presently disclosed subject matter.
Figure 12:
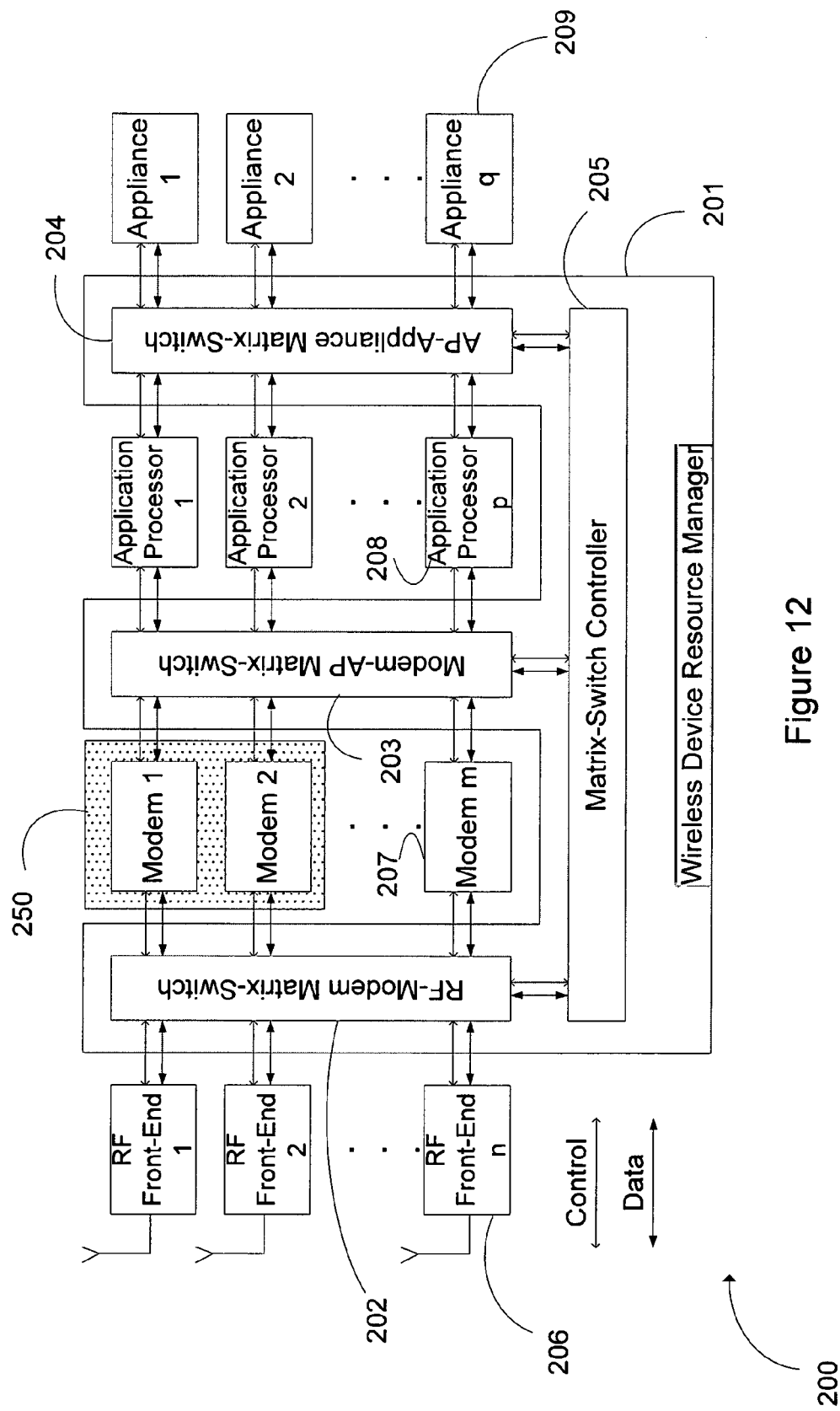
FIG. 12 is a functional block diagram schematically illustrating a wireless device system-architecture, exemplifying two modem layer elements configured as a single unit, according to the presently disclosed subject matter.
Figure 13:
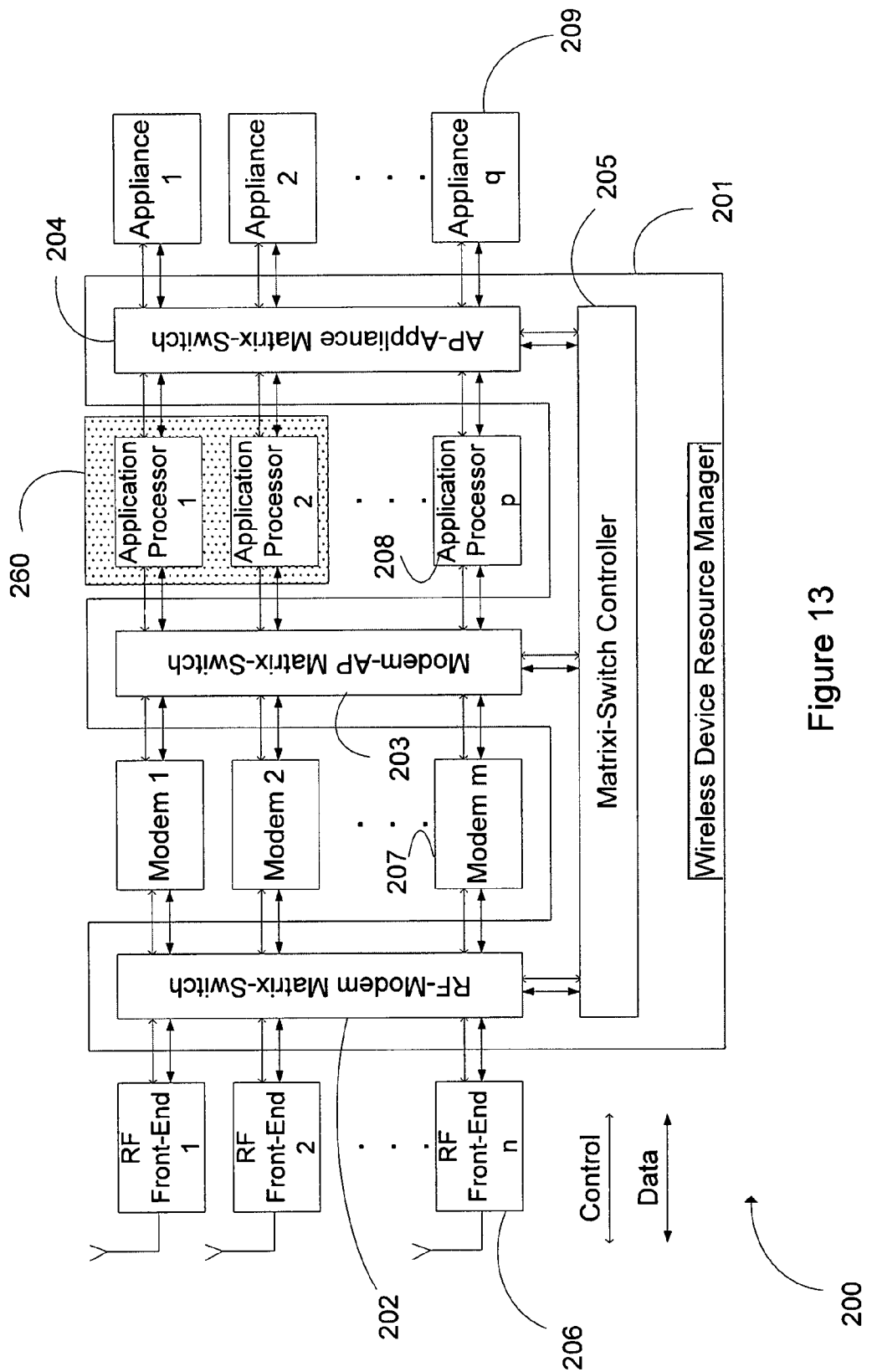
FIG. 13 is a functional block diagram schematically illustrating a wireless device system-architecture exemplifying two application layer elements configured as a single unit, according to the presently disclosed subject matter.
Figure 14:
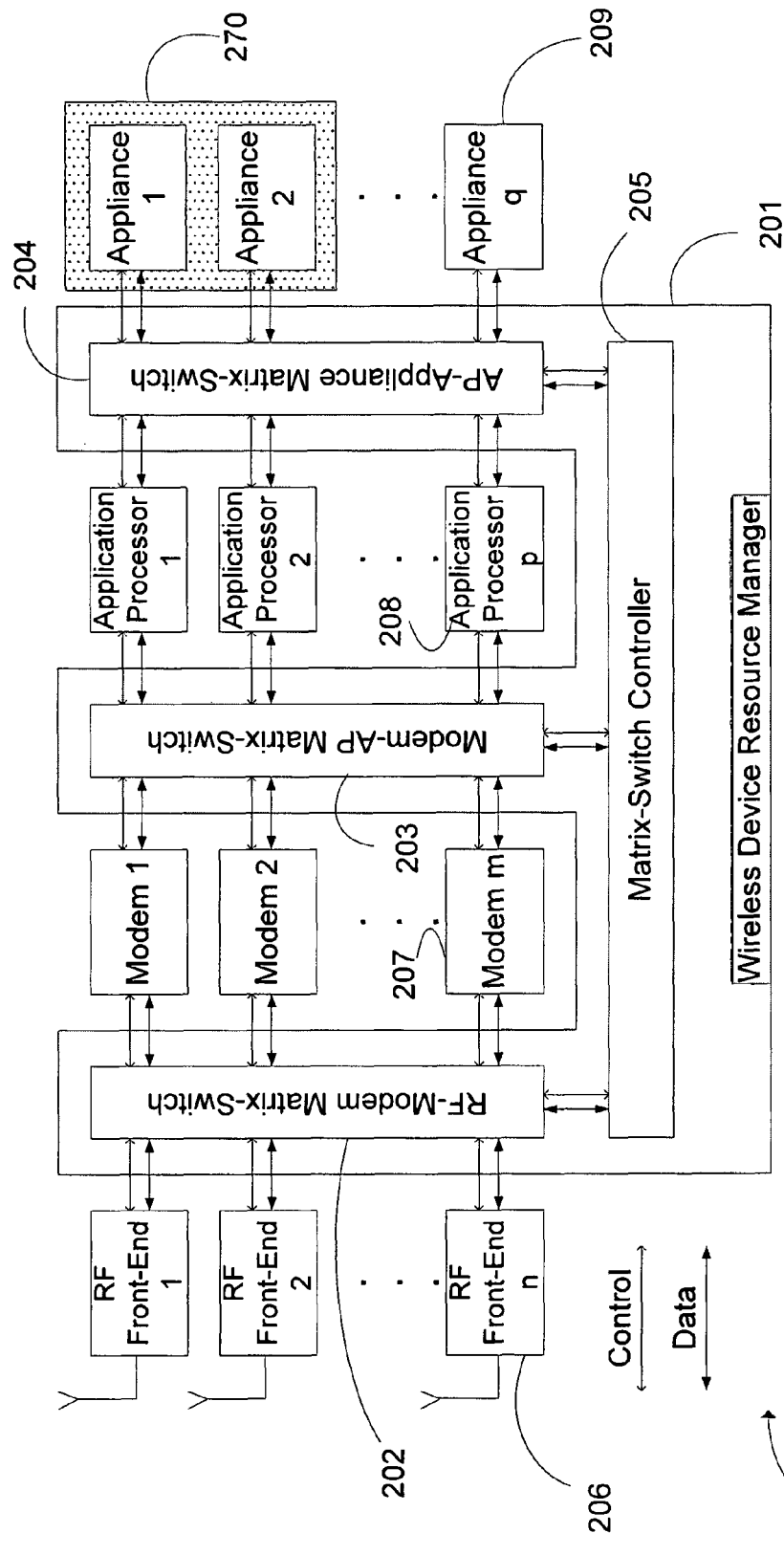
FIG. 14 a functional block diagram schematically illustrating a wireless device system-architecture exemplifying two appliance layer elements configured as a single unit, according to the presently disclosed subject matter.

As shown in FIG. 2 the layer elements in each functional layer can be configured as separate layer elements. Alternatively, or additionally, as shown in FIGS. 11-14 two or more of layer elements in a functional layer can be designed and configured as a single unified unit encapsulating the plurality of layer elements. FIG. 11 illustrates an example where two RF front-end layer elements are configured as a single unit 240, e.g. a single radio frequency integrated circuit (RFIC) chip supporting several frequency bands. FIG. 12 illustrates an example where two Modem layer elements are configured as a single unit 250 e.g. a single chip incorporating 2G-GSM (Global System for Mobile Communications) and 3G-HSPA (High Speed Packet Access) modems. FIG. 13 illustrates an example where two Application processor layer elements are configured as a single unit 260, e.g. a single card encapsulating both graphical processor and DSP processor. FIG. 14 illustrates an example where two Appliance layer elements are configured as a single unit 270, e.g. touch screen that has both functionalities of a display and a user input interface (keyboard/mouse).

A matrix-switch can be located between each two adjacent functional layers, operable to selectively connect between one or more layer elements from each of the two adjacent functional layers. A first matrix-switch 202 is located between functional layer 206 and functional layer 207, a second matrix-switch 203 is located between functional layer 207 and functional layer 203 layer and a third matrix-switch is located between functional layer 209 and functional layer 209. The term "matrix-switch" as used herein includes an analog (e.g. the matrix-switch connecting between the RF front-end and modem layers) and a digital switch, connecting between one or more inputs to one or more outputs and enabling data-transfer between different layer elements according to a desired connections setup.

Also shown in FIG. 2 is a matrix-switch controller 205 (referred herein also as "controller"), which is operatively connected to matrix-switches 202, 203, and 204 and is operable to control the matrix-switches. By setting the connection in each matrix-switch, controller 205 can determine one or more processing routes. Each processing route is a route for data-transfer, from at least one layer element in a first functional layer to at least one data element in another functional layer. For example a processing route can run from at least one layer element in a functional layer, at one end of the cascade of layers, to at least one data element in a functional layer at a second end of the cascade of layers. Each route is determined by a specific combination of connections between one or more layer elements of each of the plurality of functional layers (206, 207, 208 and 209) and one or more layer elements of its one or more adjacent functional layers. Wireless device resource manager 201 consolidates matrix-switch controller 205 and the different matrix-switches described above. For the purpose of the present discussion, when a single layer-element at one of the layers is connected to a single layer-element in an adjacent layer, the connection is considered as a single processing route. When a single layer-element at one of the layers is connected, in parallel, to more than one layer-element in an adjacent layer, each connection with each layer-element is considered in a separate processing route.

The use of multiple layer elements in different functional layers and the ability to selectively connect between one or more elements in each layer to one or more elements in the adjacent layer is advantageous in respect of known cellular architectures. For example, consider a scenario where two application processors are used, one configured as a high-sensitivity application processor with protection against malicious attacks (e.g. computer viruses, malware, etc.) and the other as a standard low-sensitivity application processor. This scenario can occur for example in a cellular communication facility of a bank which transfers both non-sensitive data (e.g. advertisements and general information) and high sensitive data (e.g. account passwords and personal information).

According to the above example, in case high-sensitivity data (which requires protection against malicious attacks) and low-sensitivity data (which does not require protection against malicious attacks) are being received substantially at the same time by a wireless device, controller 205 can be operable to instruct matrix-switch 203 to connect modem layer 207 to both a high-sensitivity application processor and a low-sensitivity application processor splitting the processing route into two processing routes, and thereby enabling the transfer of both high-sensitivity data and low-sensitivity data substantially at the same time while providing appropriate sensitivity of data protection.

While the presently disclosed subject matter is configured to enable the simultaneous transmission of data via different layer elements of the same functional layers, in some cases small variations may occur between the transmission-rate in parallel processing routes. This may result for example from differences between the characteristics of the hardware utilized in different layer elements. Thus, for the sake of clarity the terms "substantially simultaneously" or "substantially at the same time" are used to include simultaneous transmission of data as well as small variations between transmission-rate in different processing routes.

Note that the example which is given herein in relation to high and low-sensitivity application processor is non-limiting and is only for the sake of more clearly describing the invention. Alternative or additional other types of plurality of application processors can be used as well, for example one application processor for heavy-duty processing and another application processor for light-duty processing, or a redundancy of identical application processors for back up purposes. The presently disclosed subject matter is not limited to a specific number of application processors that can be utilized.

The data which is being transferred through the cascade of functional layers can be divided into two types of data. The first type is control data and the second type is the data itself (traffic). The control data includes information (metadata) characterizing the data and the data transfer. While the data is being transferred by the cascade of functional layers it is transmitted from one or more of the matrix-switches to controller 205. Based on different characteristics of the data, which are exemplified below, controller 205 can determine the required layer elements in each layer, and command the different matrix-switches to connect between these layer elements. These characteristics include for example, the communication standard and protocol, (e.g. Wi-Fi, Bluetooth, 4G, 3G, and 2G etc.) and the session type (e.g. SMS, voice call, video call, data such as image etc.), a required quality of service, a required transmission rate, etc.

Consider the previous example and assume that low-sensitivity data, in 3G communication standard, which is destined for display on a display (e.g. text message), is received at the RF front-end layer and substantially at the same time high-sensitivity or high-priority data (e.g. voice data) in 3G communication standard, is also received. According to one example, controller 205 receives from matrix-switch 202 control data in respect of the transmission protocol, determines the required connection between the RF front-end to the appropriate modem, and returns to the matrix-switch a corresponding command to execute this connection. Assuming, for example, that both high-sensitivity and low-sensitivity data is in 3G cellular communication standard, both types of data can be transferred through the same RF front-end element and the same modem. Controller 205 further receives from matrix-switch 203 information in respect of the sensitivity level of the transmitted information, determines the required connection between the modem to the appropriate application processor and returns to the matrix-switch (203) a corresponding command to execute this connection. Accordingly, the high-sensitivity data is transferred to a high-sensitivity application processor and the low-sensitivity data is transferred to a low-sensitivity application processor. Controller 205 can further receive from matrix-switch 205 information in respect of the type of the transmitted information, determines the required connection between the application processor and the appropriate appliance and returns to matrix-switch 205 a corresponding command to execute these connections. In this example the high-sensitivity application processor is connected to speakers and the low-sensitivity application processor to a display.

Alternatively or additionally, controller 205 can be configured to determine the connection between more than one functional layer to its adjacent functional layer, and in some cases to all functional layers in the processing route, based on data which is received from only part of the matrix-switches. For example, the controller can be configured to always consider Bluetooth and/or Wi-Fi transmission of data as low-sensitivity, because of the low-sensitivity nature of these networks. Thus, in the above example, where one high-sensitivity and one low-sensitivity application processors are utilized, in case data is received in the RF front-end by Bluetooth transmission, controller 205 can determine, based on the data received from matrix-switch 202, both the appropriate modem (i.e. modem for handling Bluetooth transmission) and the appropriate application processor (low-sensitivity in this case). In some cases the data received from matrix-switch 202 can be sufficient for determining the appropriate element in the appliance layer as well.

Controller 205 can be operable to determine two or more processing routes, which transfer data from a functional layer at one end of the cascade to the other end of the cascade of functional layer, where the layer elements which participate in each route are mutually exclusive in respect of the layer elements which participate in the other processing routes.

As mentioned above, the combination of layer elements in each processing route depends on the characteristics of the incoming (or outgoing) data. Thus, continuing with the previous example, the system architecture disclosed herein enables to receive low-sensitivity data (e.g. low-sensitivity image) which is received by a Wi-Fi RF front-end unit and is directed for display on a display, and substantially at the same time high-sensitivity voice data which is received from a cellular network (e.g. 3G) and which is directed to the speakers. In this example controller 205 can determine two separate processing routes each comprising layer elements which are mutually exclusive in respect of the other route. The first processing route includes an RF front-end element for receiving Wi-Fi communication connected to an appropriate Wi-Fi modem further connected to a low-sensitivity application processor connected to a display. A second processing route includes an RF front-end for receiving 3G cellular communication connected to an appropriate modem, connected in turn, to a high-sensitivity application processor further connected to a speaker. Both processing routes can operate, such that different layer elements of the same layer transfer data substantially at the same time and thereby enable faster transmission of data while maintaining the required sensitivity level required for both low sensitivity and high sensitivity data.

In other cases controller 205 can determine two or more processing routes, where only a part of the layer elements which participate in each route are mutually exclusive in respect of the layer elements which participate in the other processing routes. The previous example can be modified in order to illustrate this scenario. Consider that 3G cellular network is utilized for transmitting low-sensitivity data (e.g. text message) in addition to the high-sensitivity voice data mentioned above. In this case the same layer elements, in the RF front-end layer and the modem layer can be selected by controller 205 for both high and low-sensitivity 3G communications. In the application processor layer 208, however, controller 205 can instruct matrix-switch 203 to connect to both high-sensitivity application processor (for transferring the voice data) and the low-sensitivity application processor (for transferring the text-message). The high-sensitivity application processor is then connected to the speakers and the low-sensitivity application processor is connected to the display for displaying the text message. Note that the low-sensitivity application processor can be used for transferring data received from the Wi-Fi communication network, as well. As before, data is transferred through different layer elements of the same layer substantially simultaneously providing a fast and more efficient data-transfer.

Figure 3A:
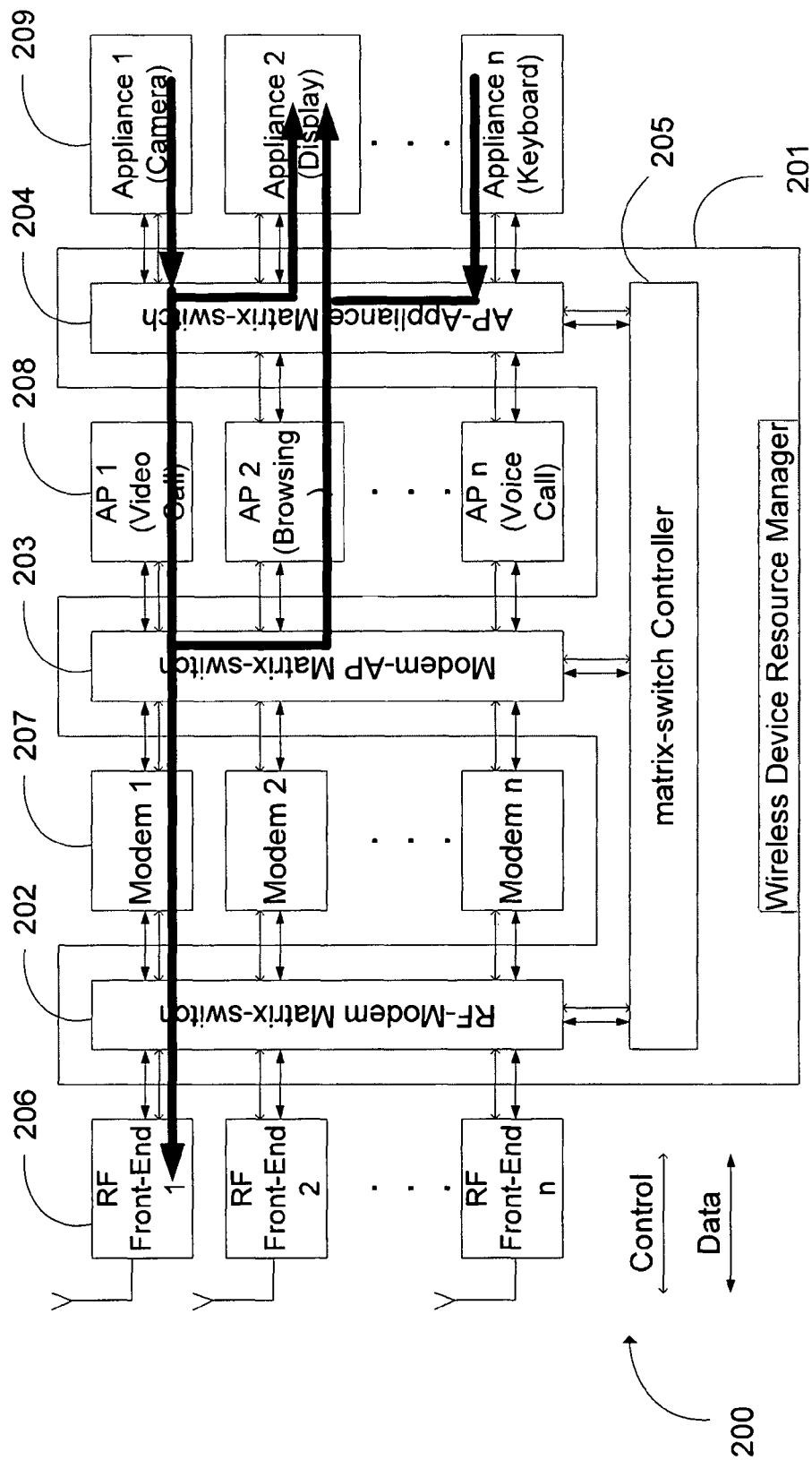
FIG. 3a is a functional block diagram schematically illustrating a wireless device system-architecture exemplifying parallel transmission of data via two different application processors, according to the presently disclosed subject matter.

FIG. 3a is a functional block diagram schematically illustrating a wireless device system-architecture exemplifying parallel transmission of data via two different application processors, according to the presently disclosed subject matter. In the illustrated processing routes data is being transferred from a single RF front-end element to a single modem element (e.g. 3G RF front-end and modem element). The modem element (modem 1) on the other hand is connected to two parallel application processors, each continuing in separate processing route and directed for performing different types of processing operations.

As indicated in FIG. 3a AP1 is a video call application processor configured for processing incoming video calls while AP2 is a browsing application processor configured for processing incoming browsing information. Accordingly, controller 205 can be configured to instruct matrix-switch 203 to connect modem 1 to both application processors AP1 and AP2 and to transmit video call data to application processor AP1 and browsing information to AP2. According to the specific example in FIG. 3a, both video call and browsing data is transmitted to a display in the appliance functional layer, for displaying the information.

FIG. 3a further demonstrates outgoing information being transmitted in two processing routes, starting at the appliance functional layer and ending at the RF front-end layer. One processing route begins with a camera, through application processor AP1, modem 1 and RF front-end 1 and the other processing route begins in keyboard, through application processor AP2, modem 1 and RF front-end 1.

In another example, consider that high-sensitivity data is being received simultaneously from a 2G cellular network (e.g. text message) and a 3G cellular network (e.g. voice). As both 2G and 3G communications are of high-sensitivity data, controller 205 can use a high-sensitivity application processor for the processing routes of both data types. However, due to the different characteristics of each incoming data-signal, in the other functional layers different layer elements can be used in each of the processing routes (e.g. a different RF front-end one for receiving 2G transmission and the other for 3G, a different corresponding modem and a different appliance, one being a display and the other being a speaker). Again different layer elements of the same layer associated with different processing routes, (which are assigned to different processing routes) can operate substantially at the same time.

Figure 15:
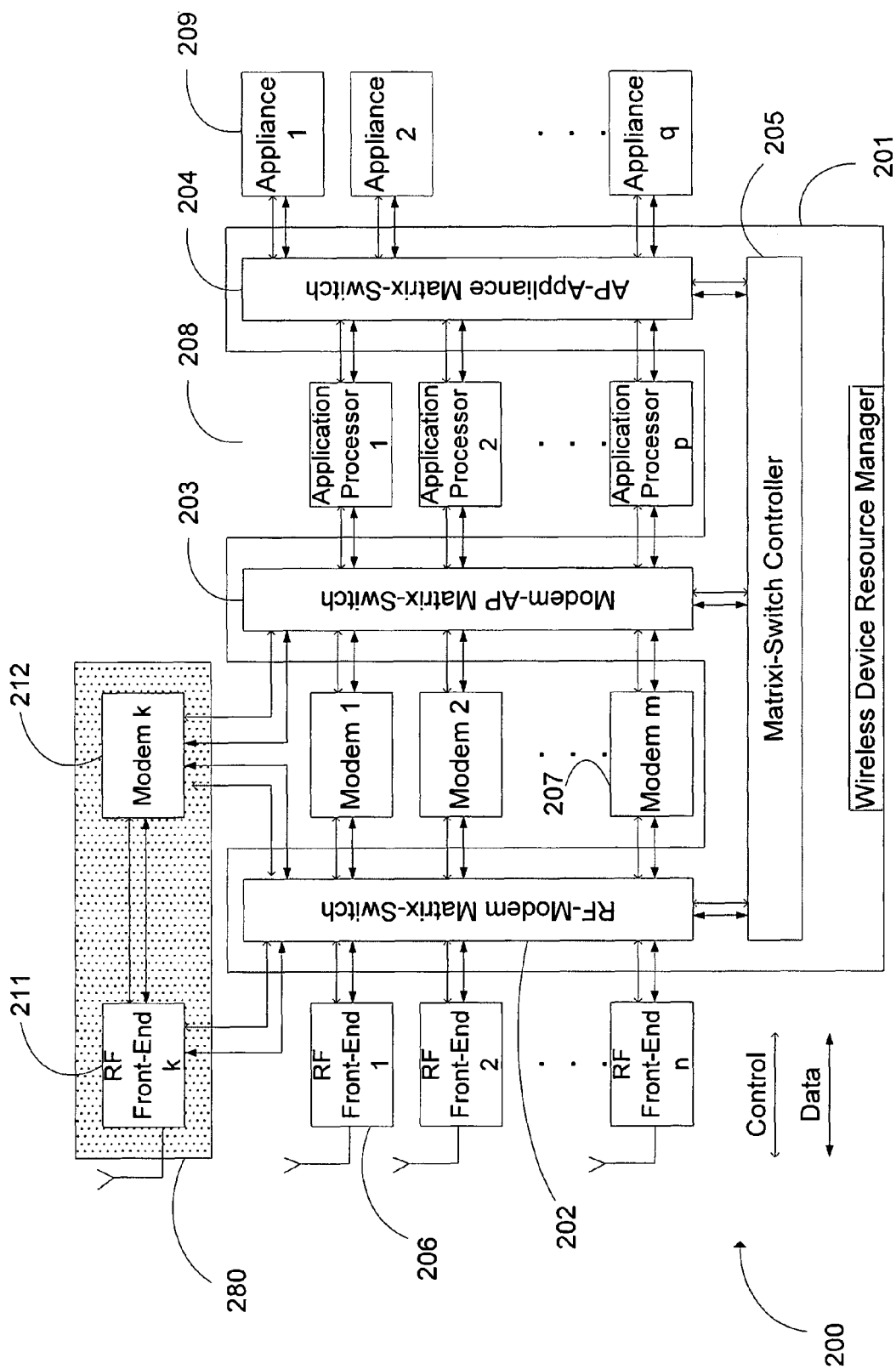
FIG. 15 is a functional block diagram schematically illustrating a wireless device system-architecture exemplifying a single functional unit comprising an RF front-end layer element and a modem layer element, according to the presently disclosed subject matter.
Figure 16:
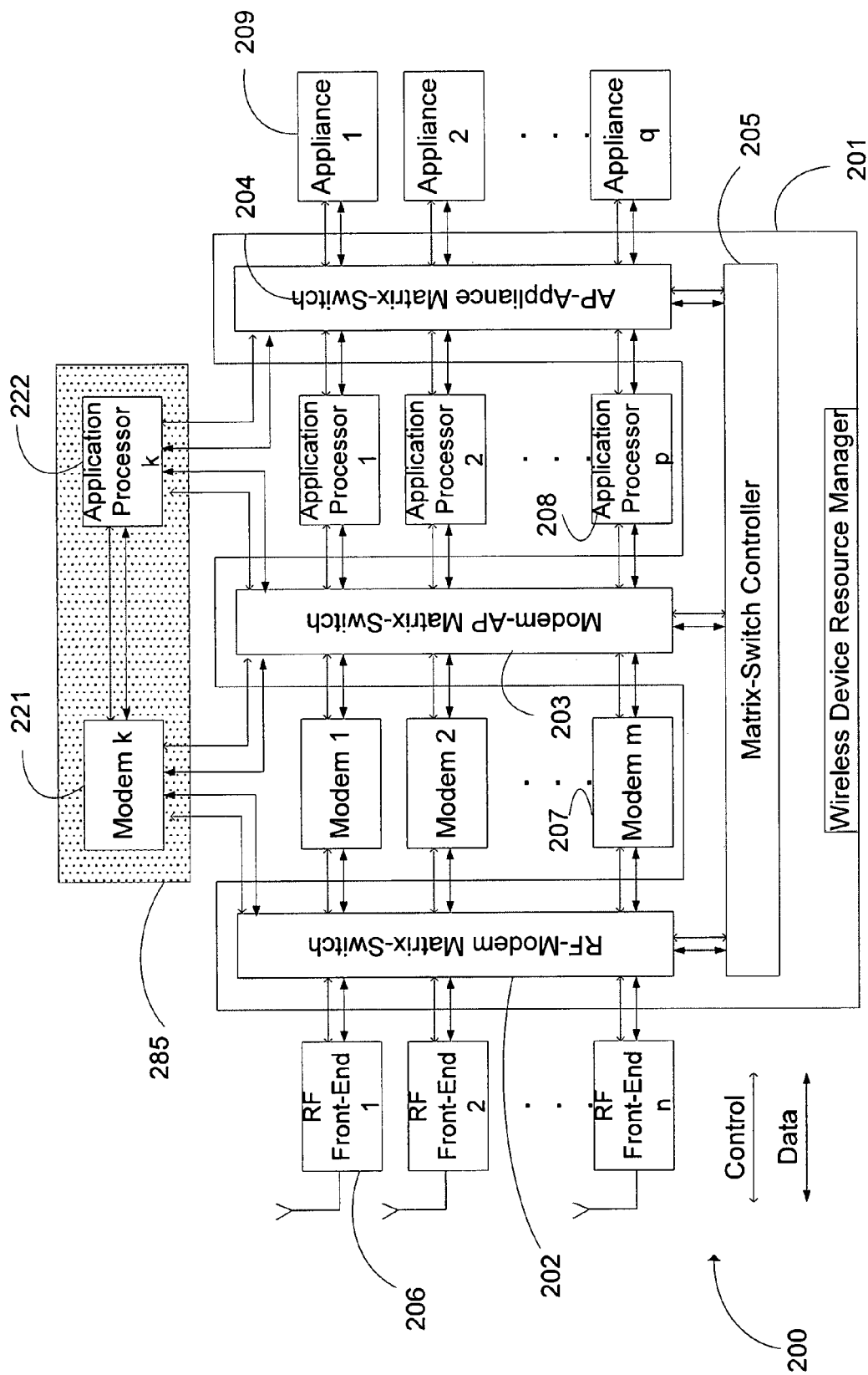
FIG. 16 is a functional block diagram schematically illustrating a wireless device system-architecture exemplifying a single functional unit comprising a modem layer element and an application layer element, according to the presently disclosed subject matter.
Figure 17:
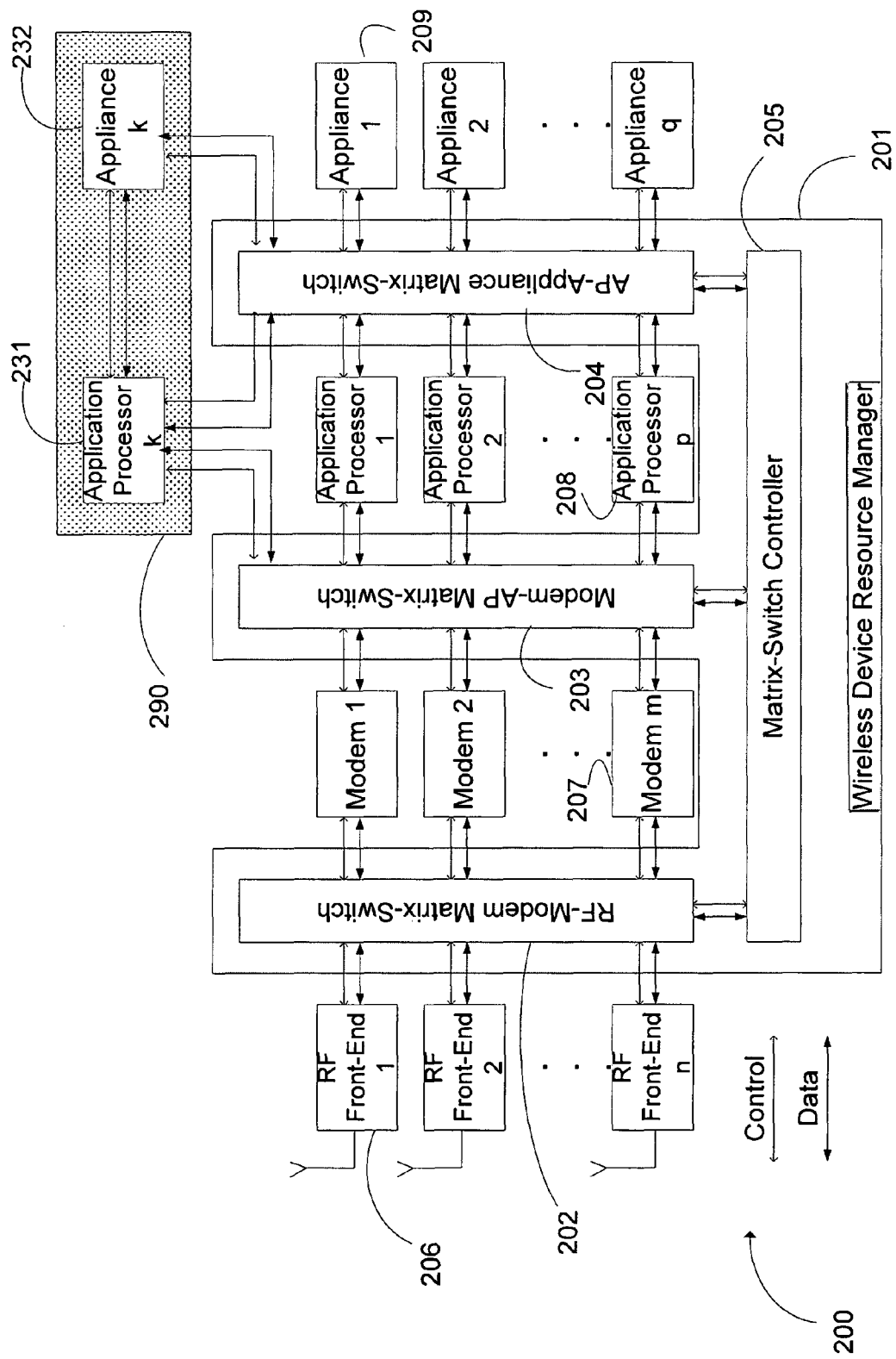
FIG. 17 is a functional block diagram schematically illustrating a wireless device system-architecture exemplifying a single functional unit comprising an application layer element and an appliance layer element, according to the presently disclosed subject matter.

In addition or instead of the system architecture which is described with reference to FIG. 2 where the array of layer elements in each functional layer resides on one side of a matrix-switch, which separates between the layer element of two adjacent functional layers, in some examples different types of layer elements can be designed and configured as a single functional unit where layer elements of different layers are directly connected. FIG. 15 illustrates an example where a single functional unit 280 includes an RF front-end layer element 211 and a modem layer element 212. FIG. 16 illustrates an example where a single functional unit 285 includes a modem layer element 221 and an application layer element 222. FIG. 17 illustrates an example where a single functional unit 290 includes an application layer element 231 and an appliance layer element 232.

Each of FIGS. 15-17 shows a plurality of direct connections between layer elements of different types in each of units 280, 285 and 290, which are part of the internal structure of the respective unit. In some cases this connection is a fixed connection while in other cases this connection is configured as a controllable connection (e.g. switch) which can be opened or closed in response to a command. Layer elements in each of units 280, 285 and 290 can be also connected to matrix-switch 202, 203, 204, similar to the other layer elements. As described above each matrix-switch is connected to controller 205, which can control the operation of the matrix-switch and thereby determine one or more processing routes. In case the connection between layer elements in one or more of units 280, 285 and 290 is controllable, controller 205 can determine whether this connection should remain open and take part in the data transfer or remain closed as explained above. In case the connection between layer elements in one or more of units 280, 285 and 290 is fixed, any decision to transfer data via one end of the unit would compel data transfer via the other layer element (of different type) in the same unit. Thus, although, units 280, 285 and 290 comprise two layer elements of different types, these units can be utilized as part of the system architecture of the presently disclosed subject matter, be controlled by controller 205 and take part in transmission of data.

Figure 3B:
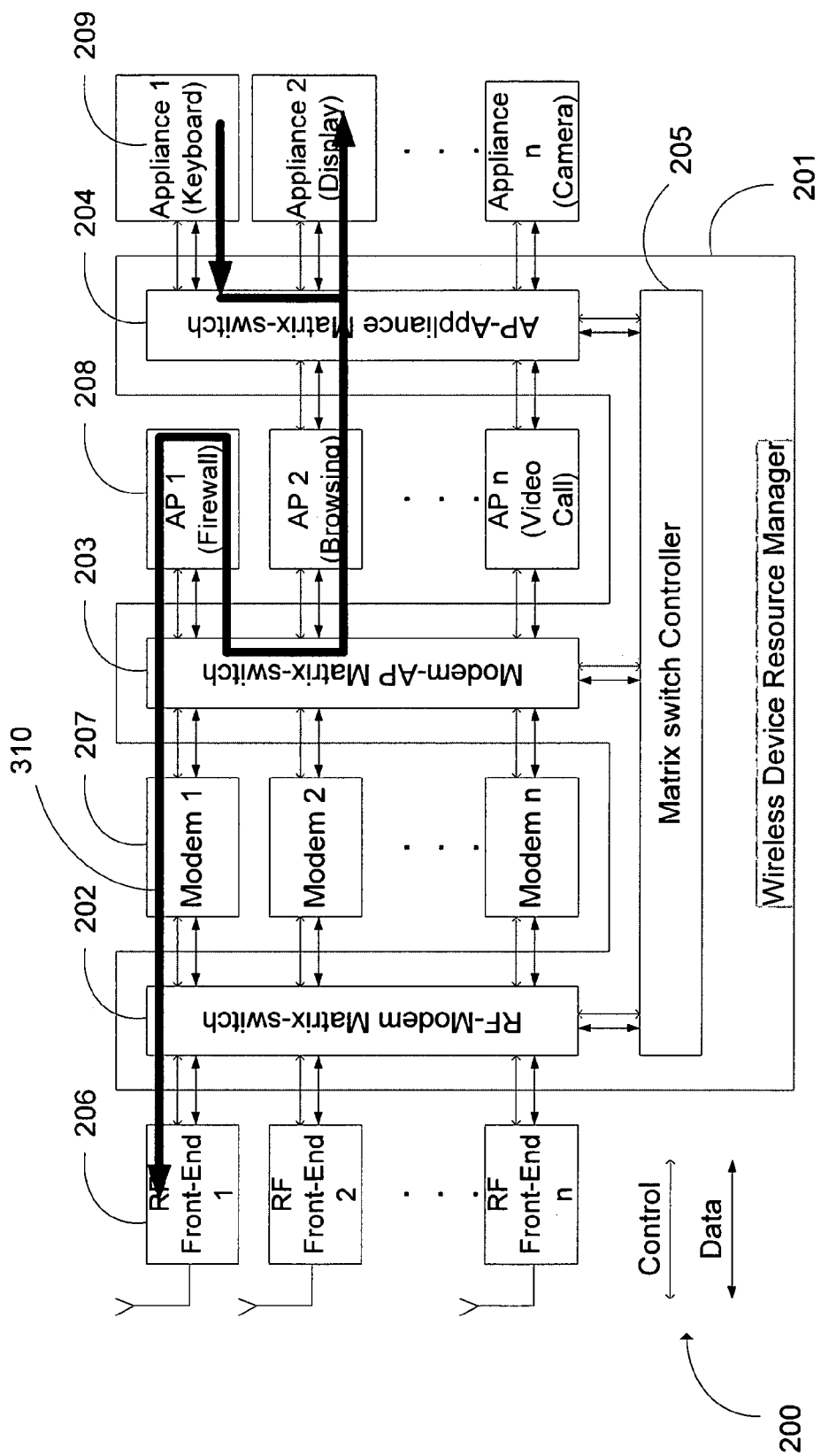
FIG. 3b is a functional block diagram schematically illustrating a wireless device system-architecture exemplifying serial transmission of data through different elements of the same layer according to the presently disclosed subject matter.

FIG. 3b is a functional block diagram schematically illustrating a wireless device system-architecture exemplifying serial transmission of data between different elements of the same layer according to the presently disclosed subject matter. In general the wireless device system-architecture disclosed herein enables the transmission of data between different elements of the same functional layer where the different elements are connected in series. Thus, data can be transferred for example from one application processor to another. Matrix-switches (202, 203 and 204) are operable to enable the transfer of data from one element to another in the same functional layer. In some implementations controller 205 is configured to receive information in respect of the transferred data (control data or data) and determine, based on the received data, whether the data should be transmitted through more than one layer element in a given functional layer. FIG. 3b further illustrates a schematic representation of a processing route indicated by line 310. The parts in FIG. 3b which are identical to those presented above in FIG. 2, were described earlier with reference to FIG. 2 and therefore are not described here in detail.

In the example illustrated in FIG. 3b application process layer 208 includes application processor AP1 which is connected only to matrix-switch 203 and not to matrix-switch 204. Application process AP1 can be operable, for example, to execute a pre-processing utility which may be required before other application processors are utilized. For instance, application processor can be configured as a firewall utility. Controller 205 can be operable to determine, based on characteristics of the transferred data (e.g. based on control data), whether the data requires processing by application process AP1. In case it does (as illustrated by processing route 310) controller 205 is operable to instruct matrix-switch 203 to serially connect between application process AP1 and other elements in the application process layer through which the data is transferred. Thus, for example incoming data signals can be first processed by AP1 and only after its content is verified as not being of a malicious nature, it is further transferred to other application processors in the layer. In the same manner, when dealing with outgoing data, controller 205 can connect appliance element 1 (e.g. keyboard) with application processor AP2 and then continue and connect in series application processor AP2 with application processor AP1.

In this way, any number of layer elements of the same functional layer can be connected in series. For example, in case there is one application processor which is sensitivity related (e.g. firewall) and there is another application processor which is configured for translation of incoming data to the spoken language, controller 205 can determine a processing route that includes both of these application processors which are connected in series with another application processor (e.g. AP2 directed for processing browsing information). Furthermore, the same layer element in a given functional layer can be connected simultaneously to more than one other element in the layer.

Figure 4:
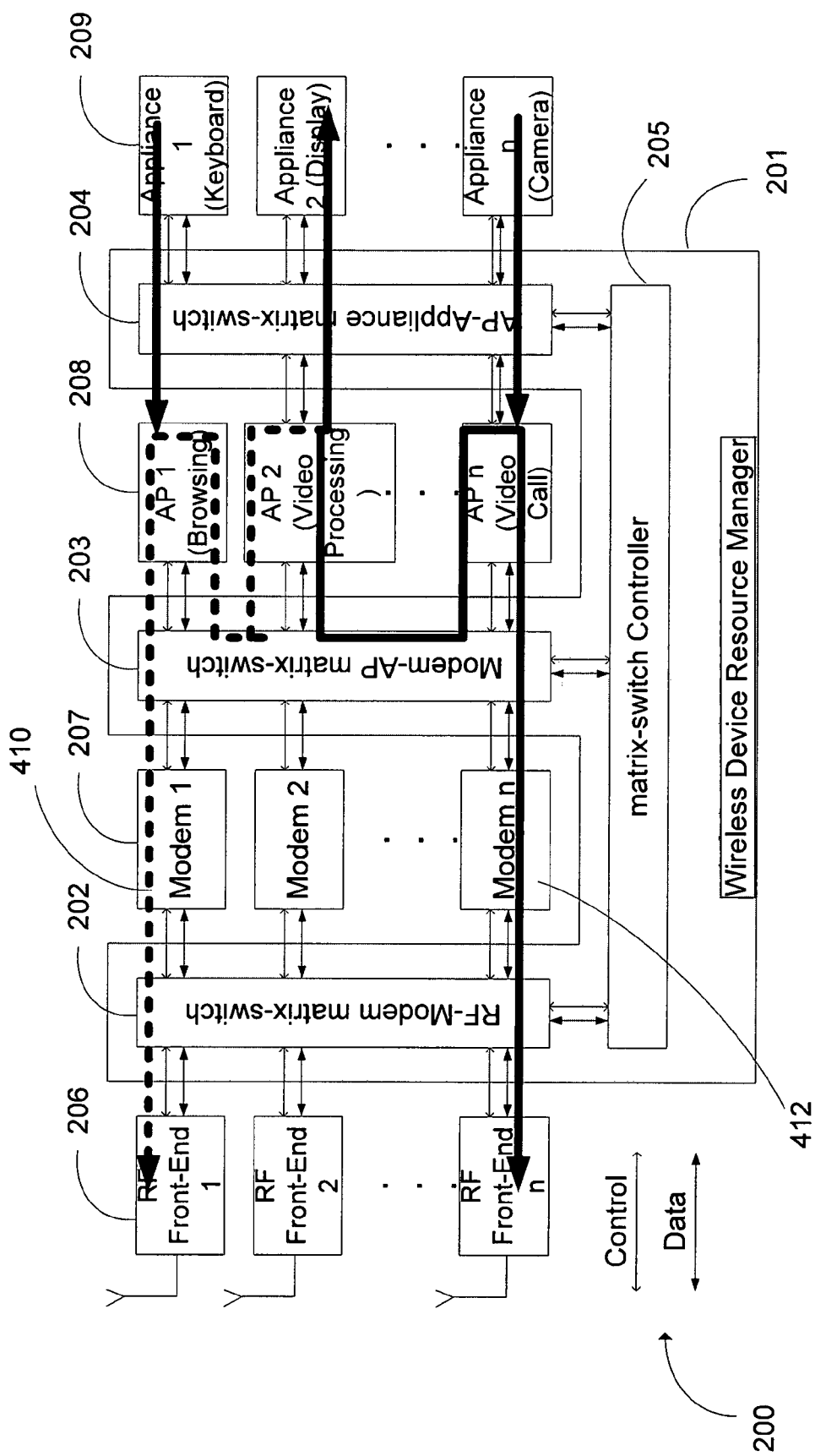
FIG. 4 is a functional block diagram schematically illustrating a wireless device system-architecture exemplifying serial transmission of data through different elements of the same layer, according to the presently disclosed subject matter.

Similar to FIG. 3b, FIG. 4 is a functional block diagram schematically illustrating a wireless device system-architecture exemplifying serial transmission of data between different elements of the same layer, according to the presently disclosed subject matter. More specifically FIG. 4 demonstrates a scenario where a layer element (in this case application processor) is connected in series substantially simultaneously to more than one other layer element of the same layer, where each connection is associated with a different processing route. FIG. 4 shows two processing routes 410 (marked by a broken line) and 412 (marked by a full line). In the example shown in FIG. 4 processing route 410 is utilized for regular Internet browsing and processing route 412 is utilized for a video conference call.

Processing route 410 includes RF front-end 1 (e.g. 3G standard, for receiving and transmitting browsing data), connected to modem 1, which is connected in turn to application processor AP1 configured for enabling browsing. Processing route 412 includes RF front-end n (e.g. 4G standard, for receiving and transmitting video call), connected to modem n, which is connected in turn to application processor APn configured for enabling video call. Since both the video data and the browsing data are to be displayed on the wireless device at the same time (e.g. by means of a split screen) both processing routes are connected in series to application processor AP2 which is operable for enabling the simultaneous display of data from both processing routes, on the wireless device display. The combined data is then forwarded to appliance 2 in the appliance layer for display, being part of both processing routes 410 and 412. Outgoing data on the other hand is directly transferred from appliance layer 209 to application processor layer 208 (e.g. keyboard in processing route 410 and camera in processing route 412).

This example shows how the wireless device system-architecture disclosed herein enables to utilize a single application processor for the use of a plurality of other application processors (each associated with a different processing route) in an efficient and useful manner. In a similar example a sensitivity related application processor (e.g. fire-wall) can be connected in series to a plurality of other application processors each connection being associated to a different processing route and thereby providing the sensitivity utility (e.g. fire-wall) for all of the processing routes by a single sensitivity designated application processor. Note that in addition to exemplifying the transmission of data in series, the processing routes which are illustrated in FIG. 4 also exemplify parallel transmission of data through different application processors (AP1 and APn) each associated with a different processing route.

Figure 18:
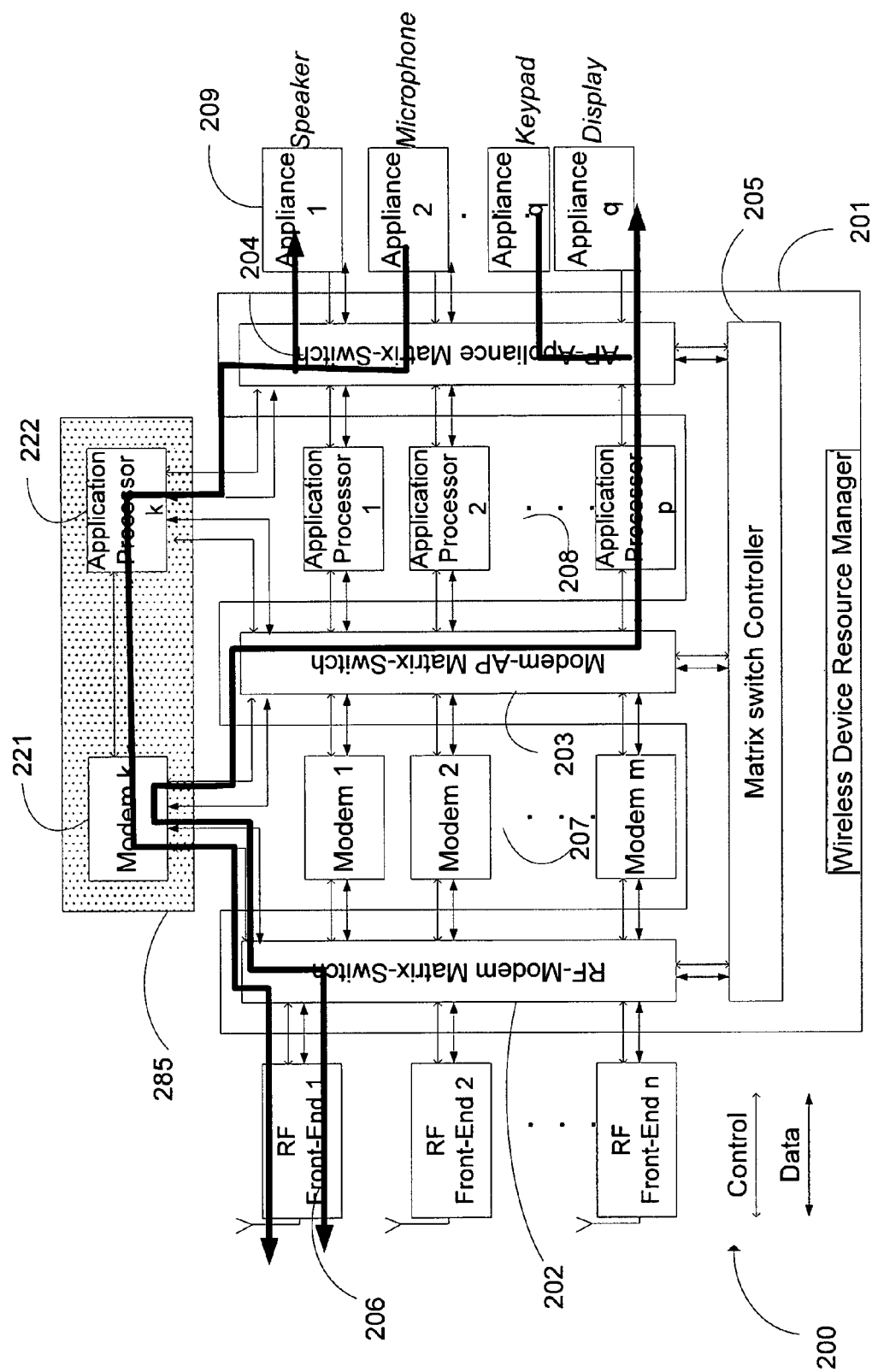
FIG. 18 is a functional block diagram schematically illustrating a wireless device system-architecture, exemplifying data transmission via a unit comprising two different layers elements, according to the presently disclosed subject matter.

FIG. 18 is a functional block diagram representing a schematic illustration of wireless device system-architecture 200, exemplifying the incorporation of unit 285, according to the presently disclosed subject matter. As explained above layer elements of different types can be configured as a unified unit. For example functional unit 285 includes a modem layer element 221 and an application layer element 222. FIG. 18 shows a processing route extending from RF front-end 1 and connected to modem 221 in unit 285. The processing route can then continue in two alternative processing routes. In one case data can be transmitted to application processor 222 in unit 285 and in another case the data can be transmitted to a different application processor (in this example Application processor p) in Application processor layer 208. For example, application processor 222 can be configured to transfer voice and/or SMS data only. Thus, incoming voice data is transferred directly from modem 221 to application processor 222 while other types of data are transmitted via other application processors.

As shown in FIG. 18 and explained above, modem 221 is connected to matrix-switch 203. The data is transferred via matrix-switch 203 to controller 205 which determines the type of data which is being transferred (e.g. by emulating an application processor) and accordingly selects an appropriate application processor to be used in the transfer and processing of the data. Controller 205 returns a control command to unit 285 for operating a switch in unit 285 and directing voice data via application processor 222. The operation of the switch determines which channel will be used for transferring the data. As explained above with reference to FIG. 2 and FIG. 3a in case multiple types of data are transmitted or received substantially at the same time the data can be transmitted via both application processor 222 and other application processor, substantially at the same time. As further exemplified by FIG. 18 voice data is transmitted via application processor 222 to relevant appliances in functional layer 209, including for example a speaker and a microphone. Other types of data (e.g. video or web data) are transferred via an appropriate application processor to relevant appliances in functional layer 209, including for example keypad and display.

In some cases an application processor in functional layer 208 is configured to communicate and transfer data to specific elements in functional layer 209. In such cases there is no need for an additional control command from controller 205 to further direct the data. In other cases, where an application processor can transfer the data to more than one element in functional layer 209 additional control commands are received from controller 205 for further directing the data in the correct processing route.

Figure 5:
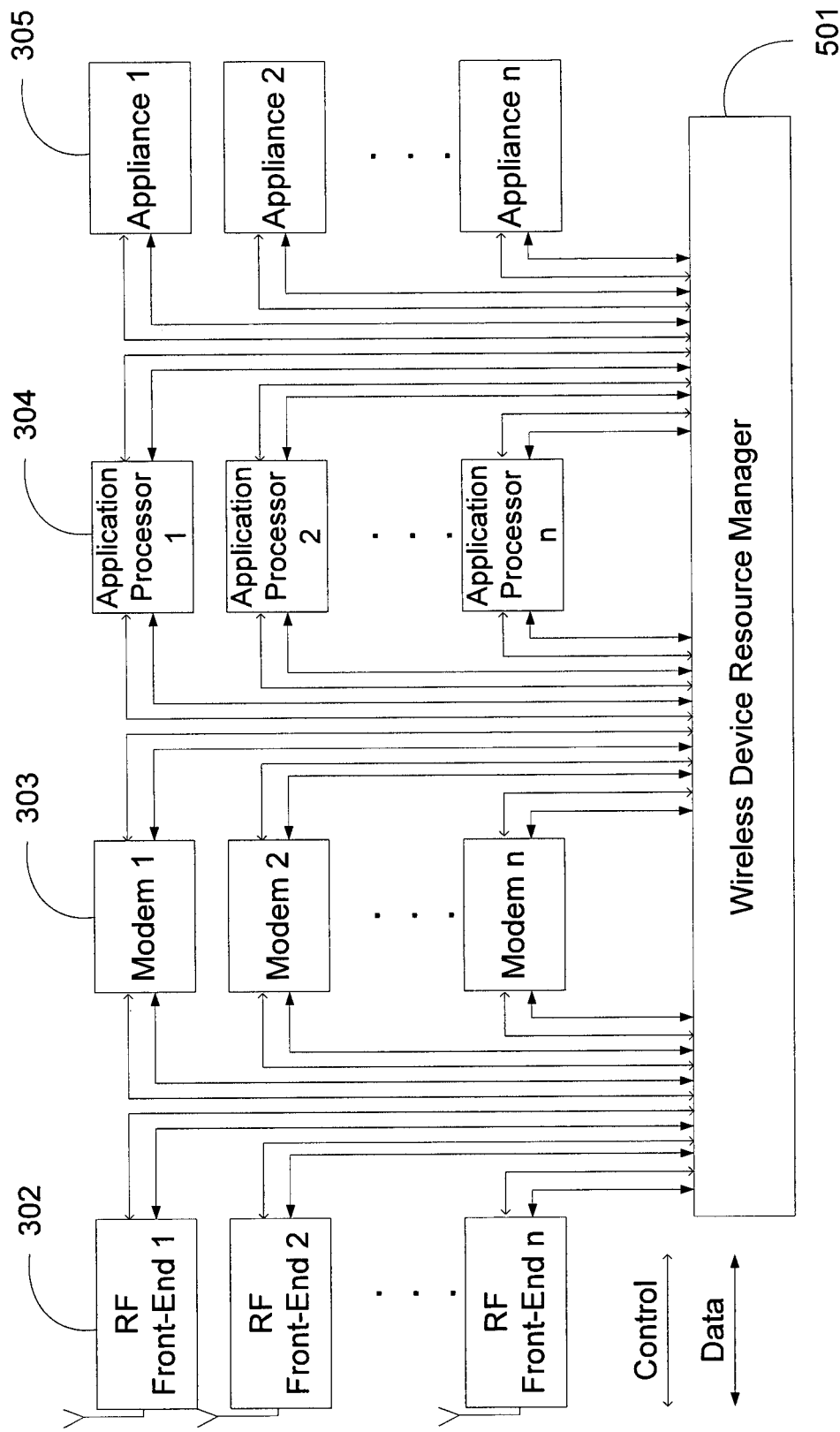
FIG. 5 is a functional block diagram schematically illustrating a wireless device system-architecture, according to the presently disclosed subject matter.

FIG. 5 a functional block diagram schematically illustrating a wireless device system-architecture, according to the presently disclosed subject matter. Unlike the architecture which was previously illustrated with reference to FIG. 2, FIG. 5 discloses an architecture where the entire functional units are consolidated into a central unit (e.g. wireless device resource manager). The matrix-switches which were described earlier as three separate units, each being distributed between a pair of functional layers, are now replaced by equivalent functional units which are configured as part of a wireless device resource manager 501. For example, the three matrix-switches (202, 203 and 204) can be incorporated as part of resource manager 501. Matrix-switch controller 205 can be also configured as part of resource manager 501 and can be operable to perform at least the functionalities described above with reference to FIG. 2 to FIG. 4. The different layer element in each functional layer (302, 303, 304 and 305) can be directly connected to the resource manager. The plurality of connections enabling to selectively connect between one or more layer element of one layer to one or more layer element of an adjacent layer are made from each matrix-switch incorporated within resource manager 501. According to this alternative system-architecture, resource manager 501, can be configured as plug-in unit which is connectible to a wireless device, thereby providing the wireless device with the functionalities which were described above in respect of the system-architecture disclosed with reference to FIG. 2 to FIG. 4.

In addition to the system-architecture disclosed with reference to FIG. 2 and FIG. 5 in some cases matrix-switch controller 205 can be located as part of one of the matrix-switches. In such case, a matrix-switch is configured to incorporate components which facilitate the functionalities of controller 205 as described herein. The matrix-switch operating also as control 205 can be connected to all other matrix switches in order to enable its operation as controller 205. According to another scenario, the functional parts of controller 205 can be distributed over different matrix-switches. According to yet another scenario, controller 205 can be implemented as one or more application processors, located in the application processors functional layer.

In some cases it may be needed to change the configuration of a processing route after it has been determined while data is being transferred through the processing route. For example in case initially data is being transmitted to a wireless device in 3G communication standards, and during the transmission of the data the user moves out of the 3G transmission range and enters a 2G transmission range. Controller 205 is operable to identify this change in the incoming communication standard or protocol and adapt the connections between the relevant functional layers according to the identified change. In this example, controller 205 can connect a 2G RF front-end to a suitable modem instead of the 3G RF front-end which was previously used. Or in another example, where multiple application processors of the same kind are available to be used, and the selected application processor fails to operate for some reason, controller 205 is operable to identify this malfunction and connect a different application processor instead of the one that failed.

As explained in more detail below the wireless device system-architecture disclosed herein is configured to allow smooth transition from one layer element to another layer element of the same functional layer, in order to avoid disconnection during data-transfer, minimize the interruption to data-transfer and thus maintain a high quality communication. Matrix-switches 202, 203 and 204 are specifically configured to this end.

Figure 6A:
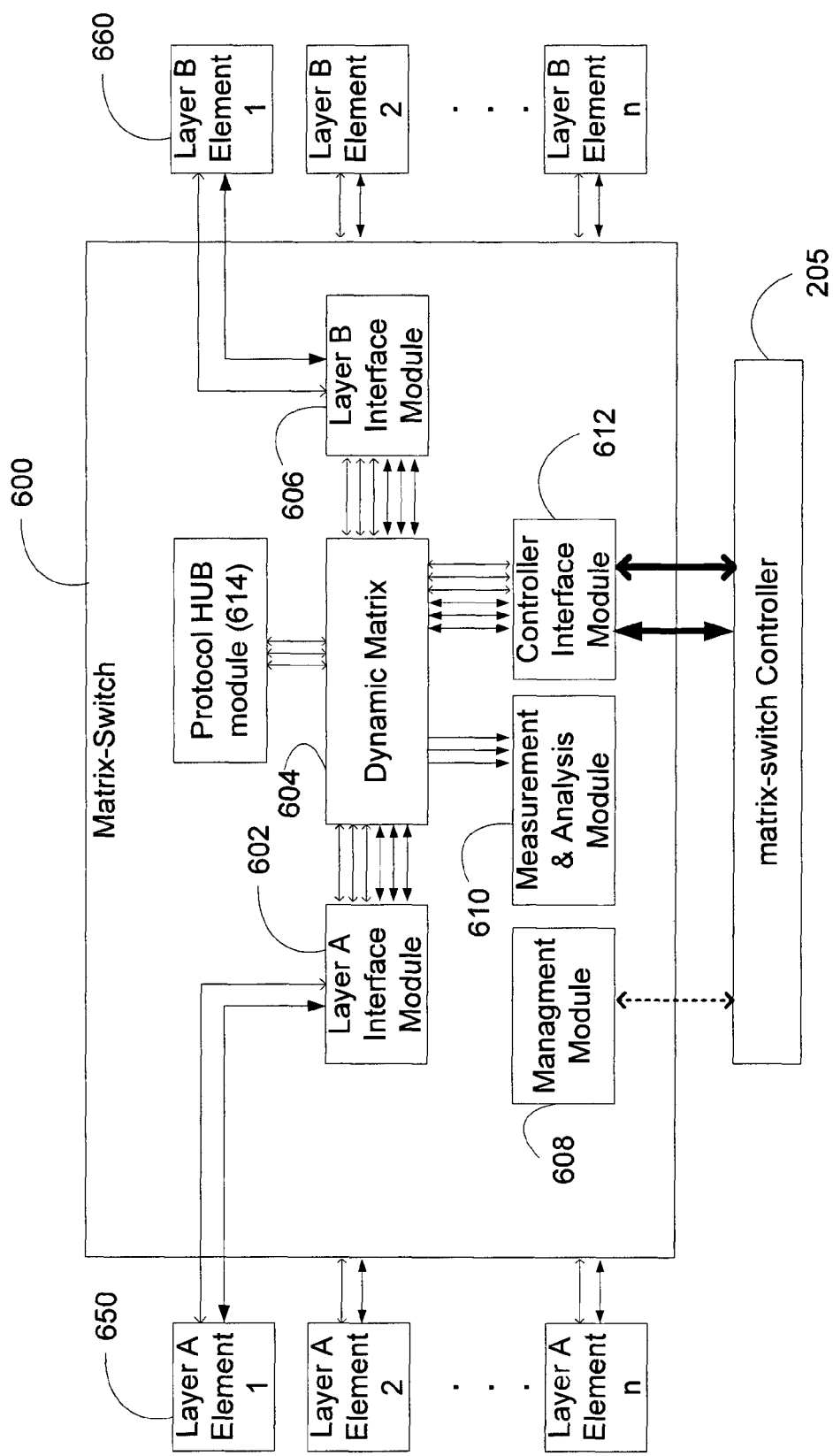
FIG. 6a is a functional block diagram schematically illustrating an example of a matrix-switch, according to the presently disclosed subject matter.

Turning now to FIG. 6a showing a functional block diagram schematically illustrating an example of a matrix-switch, according to the presently disclosed subject matter. As explained above, matrix-switches 202, 203 and 203 are located between pairs of functional layer and enable to selectively connect between one or more layer elements of one layer and one or more layer elements of another layer. Matrix-switches are also connected to controller 205 which is operable to determine a combination of connections between two adjacent functional layers. In the configuration illustrated in FIG. 6a matrix-switch 600 comprises an interface module 602 for establishing connections between one or more layer elements on one side and interface module 606 for establishing connections with one or more layer on the other side. A dynamic matrix 604 is located between interface module 602 and interface module 606 and used for connecting between the two modules. Dynamic matrix 604 is further connected to measurement and analysis module 610 and controller interface module 612 which is in turn connected to controller 205.

Matrix-switch 600 can further comprise a management module 608 which is operable to communicate with controller 205. Management module 608 is an internal controller located within the matrix-switches and is configured to control the different operation and components within the matrix-switch and communicate and coordinate its operations with controller 205. Measurement and analysis module 610 is operable to receive and process information in respect of different characteristics in respect of the data transfer, for example, the data transfer rate between layers, the connectivity of the layer, is the layer operating or not, the time period during which the layer is in operation, the transmission power, the time of delay in transmission and so forth. This information can be used by the management unit 608 in the matrix-switch and is also transferred to, and used by controller 205 for making decisions in respect of the required connection between different elements of adjacent layers. According to the specific configuration of a matrix switch and controller 205 different functionalities can be distributed between management unit 608 and controller 205. Assigning part of the data processing and determination of connections between the layers, to management unit 608 reduces the processing load on controller 205 and allows faster and smoother operation and data transmission. Connections are established and eliminated between elements in the different layers based on this information as explained above and below. For example, in case it is determined based on the above mentioned information that a channel (i.e. processing route) is unstable, an alternative channel can be established. Controller interface module 612 is configured to interface and facilitate transmission of data between matrix-switch controller 205 and dynamic matrix 604.

Matrix switch 600 further comprises a protocol hub module 614. Protocol hub module 614 is configured to adapt a given communication protocol for communication in a number of parallel processing routes substantially at the same time. A given communication protocol may not be suited for communication data in more than one processing routes simultaneously. Thus, in case data is being transmitted in more than processing routes, module 614 is configured to receive the communicated data, which is being transmitted in a certain communication protocol, and adapt the data and protocol to enable its communication in a number of parallel processing routes substantially at the same time. For example, in case data is being communicated with modem elements according to AT-command protocol which is usually point-to-point protocol, in case data is being transmitted to more than one application processors, module 614 can be configured to adapt the protocol and/or the transmitted data for transmitting data to more than one target substantially at the same time.

Figure 6B:
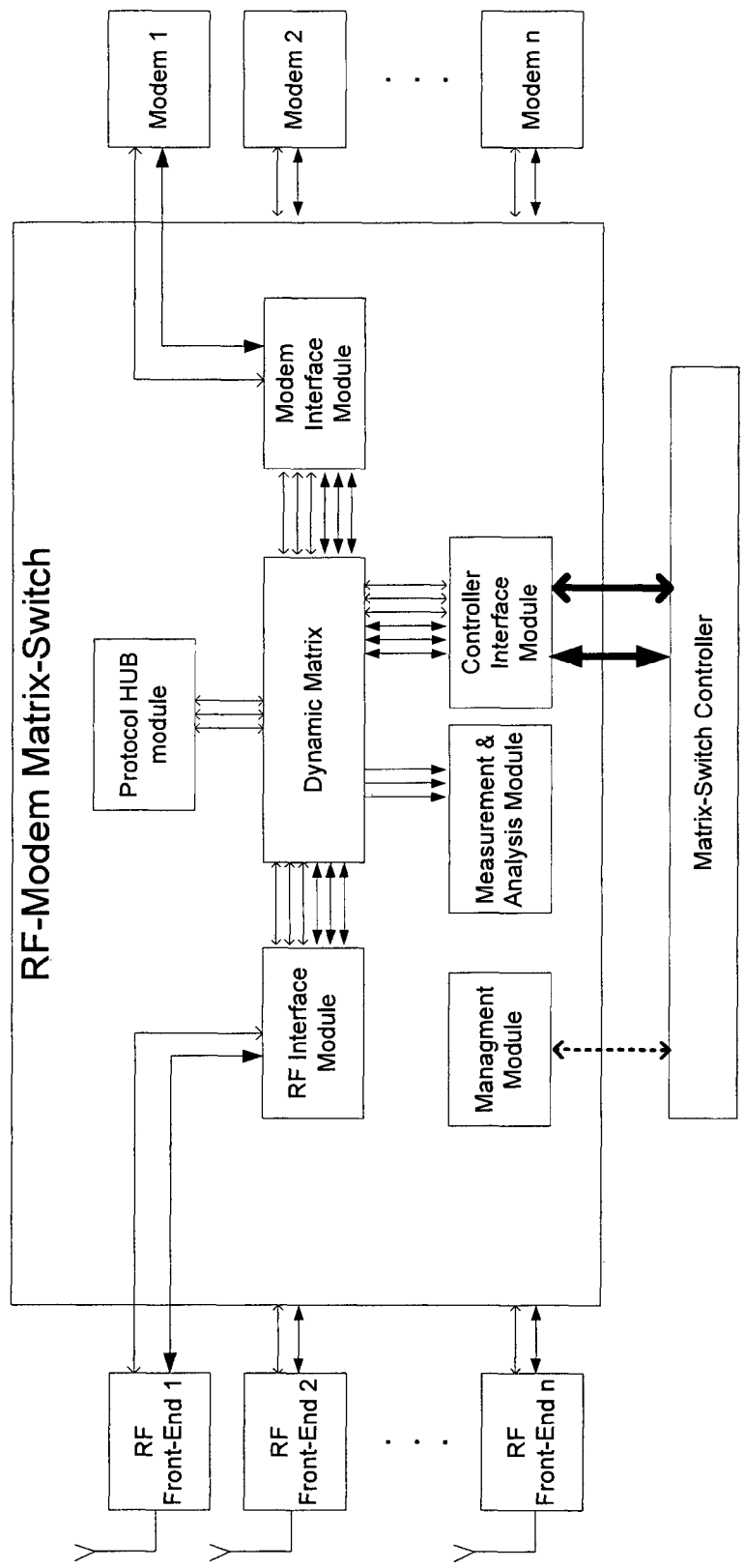
FIG. 6b is a functional block diagram schematically illustrating a specific example of an RF-Modem Matrix-switch, according to the presently disclosed subject matter.

FIG. 6b is a functional block diagram exemplifying the architecture described with reference to FIG. 6a schematically illustrating a specific example of an RF-Modem Matrix-switch, according to the presently disclosed subject matter.

Figure 7:
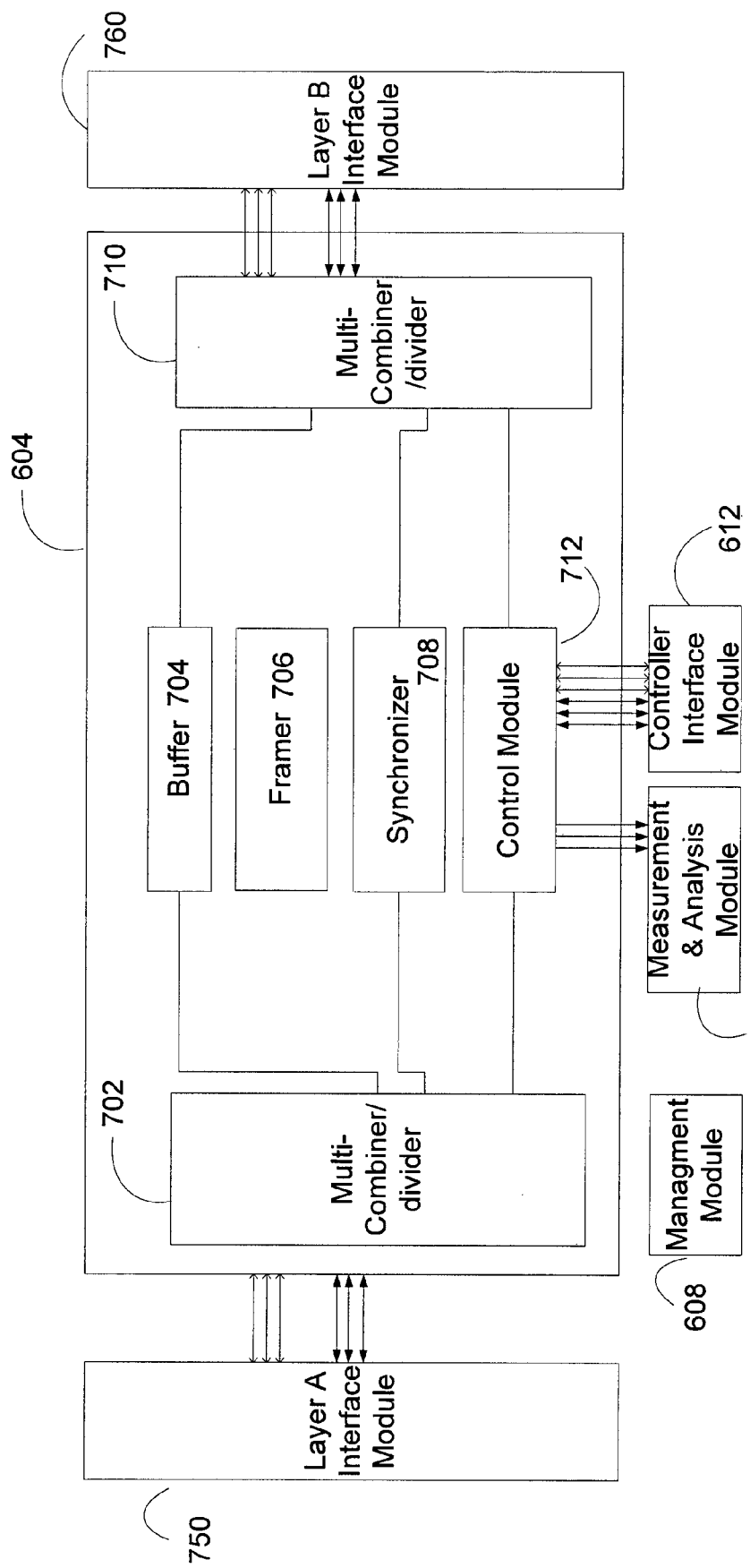
FIG. 7 is a functional block diagram schematically illustrating an example of dynamic matrix 604, according to the presently disclosed subject matter.

FIG. 7 is a functional block diagram schematically illustrating an example of the architecture of dynamic matrix 604, according to the presently disclosed subject matter. Matrix-switch 600 with the help of dynamic matrix 604 is designed to enable smooth transmission from one layer element to another layer element in the same layer. When data is being transmitted from one or more layer element of a first functional layer to one or more layer elements of an adjacent functional layer, after the specific connections of the respective processing routes are determined (e.g. with the help of controller 205) data transferred can be synchronized with the help of dynamic matrix 604.

For example, consider matrix-switch 203 (Modem-AP Matrix-Switch) located between modem functional layer and application processor functional layer, where a processing route connecting a given modem and a certain application processor needs to be modified such that the same modem is disconnected from the current application processor and connected to a different application processor. Matrix-switch 600, with the help of dynamic matrix 604, is configured to enable smooth transition of the connection of the modem from one application processor to an alternative application processor.

In one example, based on the control data which is received by controller 205 the decision to change between the application processors is made by controller 205 which instructs the respective matrix to execute the switch. In some other examples, the decision can be made by the matrix-switch without the help of controller 205.

In some cases, after the decision is made and the matrix-switch is instructed to switch the connection and connect to a different application processor, the switch is not executed immediately. Instead data-repository (buffer) 704 located in dynamic matrix 604, is used to temporarily store incoming data from one or more modems in a modem layer, while framer module 706 is operable to analyze the data in the buffer and group the data into group of one or more packets of a predefined size or including certain type of information (e.g. a group of packet which represents a full video frame in case of a video application). Once a group of packets is formed the synchronizer 708 is notified and it coordinates the transmission of the group of packets.

For example, synchronizer 708 can determine when to transfer the data to the next layer or in case the data is being transferred to more than one layer element (in this example application processor) synchronizer module can be operable to synchronize the data-transfer to all layer elements at the same time. By sending groups of packets in a synchronized and coordinated fashion, disconnections and interruptions in the data-transfer are greatly reduced and the transmission of data in different processing routes can be performed simultaneously.

Furthermore, in some cases, in response to an indication that the current application processor should be replaced with another application processor, dynamic matrix 604 can be operable to continue and send the transferred data to both the current and the new application processors (e.g. while a group of packets is being assembled in the buffer). Only when an indication is received in matrix-switch 203 (in management module 608) and/or controller 205 that the new application processor is connected and operable for transmission of data (and possibly also that the data is ready) the synchronizer 708 ceases to transfer the data to both application processors and continues to send it only to the new application processor.

In addition, as explained above, an incoming data signal can be transferred substantially simultaneously from one functional layer (e.g. RF front-end element) to a plurality of elements in an adjacent functional layer (e.g. modems). Each modem can provide indication in respect of its quality of service (QOS) to controller 205 and/or to matrix-switch 202 and based on this indication a decision can be made (in either controller 205 or a respective matrix-switch) which of the layer elements (e.g. modems) should be used for further data processing and transmission and whether any of the layer elements (e.g. modems) should be disconnected.

Parallel transmission to a plurality of layer elements can be executed, for example, in case all wireless networks occupy the same frequency band (e.g. 2G, 3G and 4G@1800 MHz band) and can therefore receive the same transmission. One or more RF front-end elements can receive the incoming signal and transmit it to a plurality of modems each corresponding to a different communication standard and/or protocol and as explained above. After the QOS of all modems is determined, only the connection to one or more modems with a QOS which is greater than a predefined threshold is retained. As a result of this parallel data transfer the optimal time for switching from one layer element to another can be selected and the switch itself will accordingly be smoother and less faulty. In response to a respective indication synchronizer 708 can synchronize replacement between different modem layer elements at the right time.

Synchronizer 208 can be connected to a multi combiner/divider (702, 710) which is connected to a layer interface on each side. Multi combiner/divider can be operable, for example, to enable communication of "one-to-many" by duplicating the transmitted data and which is organized by buffer 704, framer 706 and synchronizer 708 and transmit it to several layer elements according to the synchronization set by synchronizer 708. Multi combiner/divider can be also operable to consolidate data transmission which is received from a plurality of functional layer elements. For example, in case data received from a number of layer elements is directed to the same layer element in another functional layer.

Figure 8:
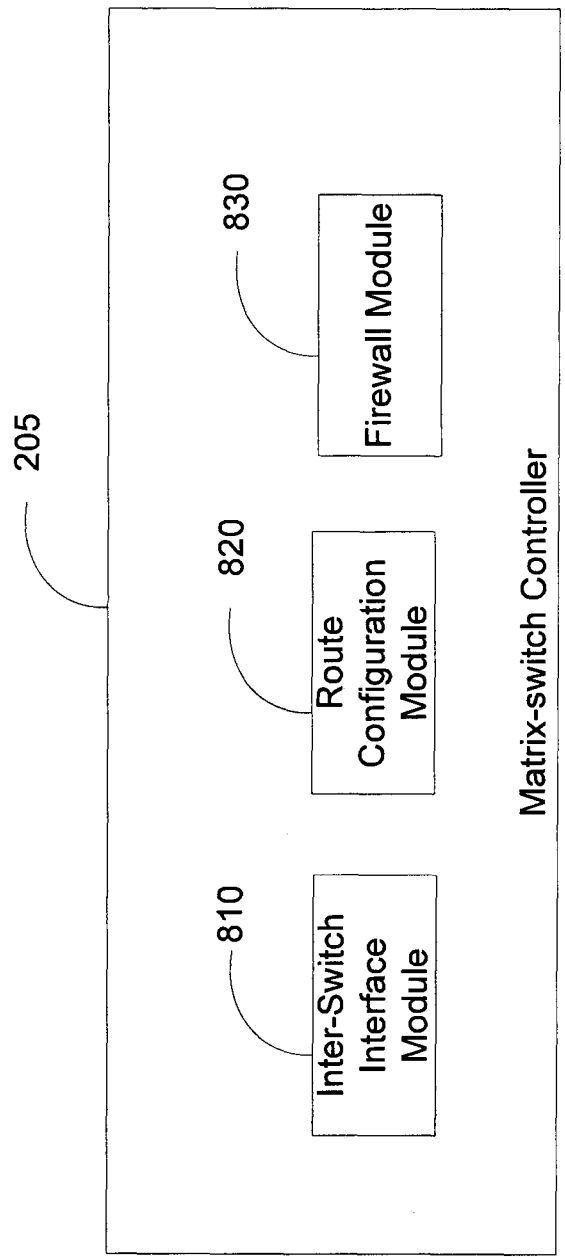
FIG. 8 is a functional block diagram schematically illustrating matrix-switch controller 205, according to the presently disclosed subject matter.

FIG. 8 is a functional block diagram schematically illustrating a matrix-switch controller 205, according to the presently disclosed subject matter. Matrix-switch controller 205 is a processing unit, which as explained above is configured to control the operation of the matrix switches 202, 203 and 204. Matrix-switch controller 205 can interface with all matrix-switches in resource manager 201. Based on information which is received from the different matrix-switches, controller 205 can determine the required connection between layer elements and thereby create different processing routes.

Matrix-switch controller 205 can comprise inter-switch interface module 810 and route configuration module 820. Inter-switch interface module 810 is configured to determine the connection between different layer elements and thereby create one or more processing routes. Module 810 can be configured to determine the connections between the different layer elements based on different type of information which is received via the connection to the different matrix switch.

For example, this information can include the type of communication protocol, characteristics of the data itself (e.g. voice data, SMS, video etc.), additional metadata and control data which is transmitted together with the actual data, input which is received from a user of the device directly from the appliance layer etc.

The connections which are selected by inter-switch interface module 810 are executed by route configuration module 820 which communicates to the different matrix-switch the respective instructions to connect between different layer elements. Route configuration module 820 is also configured to monitor and maintain the connections. For example, route configuration module 820 can be configured to ensure that all required connection are created, to make sure no disconnections occurred and to instruct a respective matrix-switch to reconnect between layer elements in case they are disconnected.

Optionally matrix-switch controller also comprises a firewall module 830 which is configured to protect against malicious attacks. Since different functional layers are interconnected, a risk arises that malicious content would enter one functional layer and then reach other parts of resource manager via the connections between the functional layers. Thus, in order to provide protection against a hostile intrusion of malicious content, firewall module 830 can be configured to monitor the data which is being transmitted between the different functional layers and search for malicious content. In case such content is detected, the content can be quarantined or removed by firewall module 830 in order to prevent any further infection of other parts of system 200.

Figure 9:
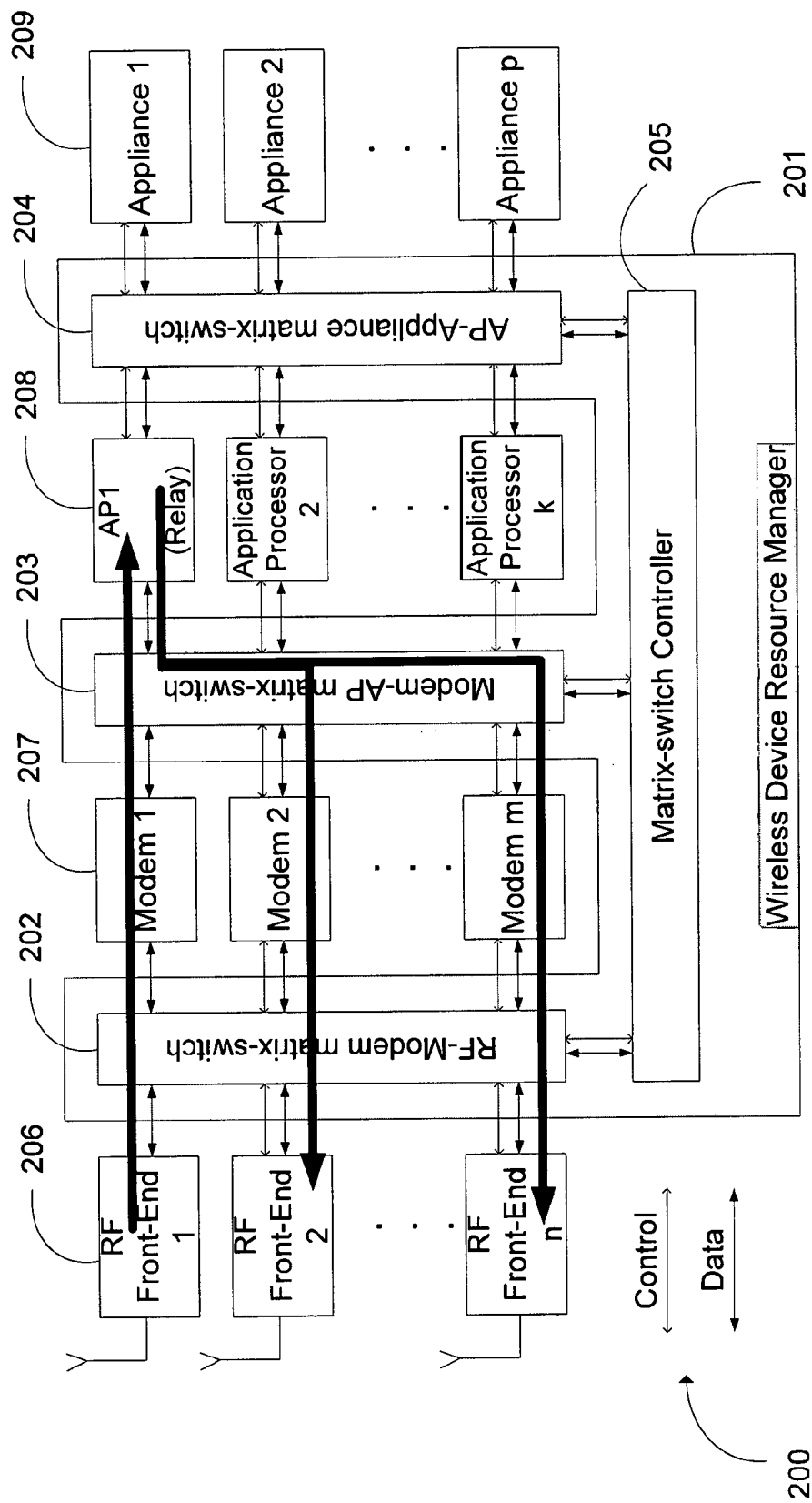
FIG. 9 is a functional block diagram schematically illustrating a wireless device system-architecture, exemplifying implementation of a relay, according to the presently disclosed subject matter.

FIG. 9 is a functional block diagram schematically illustrating a wireless device system-architecture exemplifying implementation of a relay, according to the presently disclosed subject matter. As shown in FIG. 9 the disclosed wireless device system-architecture can be configured as a dynamic relay where data from one source RF front-end (e.g. RF front-end 1) is transferred via a modem (e.g. modem 1) to an application processor (e.g. AP1) operable as a relay. The data can be processed in the relay and transferred back from the relay (AP1) via another modem (e.g. modem 2 and modem n) to a different RF front-end (e.g. RF front-end 2 and RF front-end n respectively).

The relay is dynamic in a number of ways. First, the RF front-end and modem type can vary dynamically (e.g. over time), thus the relay is not limited to a specific channel (e.g. G3, G2, Wi-Fi etc.). In addition the number of outgoing routes of the incoming data can vary based on different criteria and requirements. Furthermore, a number of application processors each operating as a relay, of the same type or of different types, can be used simultaneously providing a multi-channel replay.

In a similar manner, the disclosed wireless device system-architecture can be configured as a dynamic bridge. In this configuration instead or in addition to an application processor operating as a relay, an application processor can be configured to operate as a bridge. In this case incoming data of one communication standard and/or protocol of one network can be adapted by application processor (e.g. AP2) to one or more other communication standards and/or protocol of one or more other networks and transmitted back in order to enable the communication of the data over multiple networks. The bridge is dynamic for reasons similar to those specified above in respect of the relay.

Figure 10:
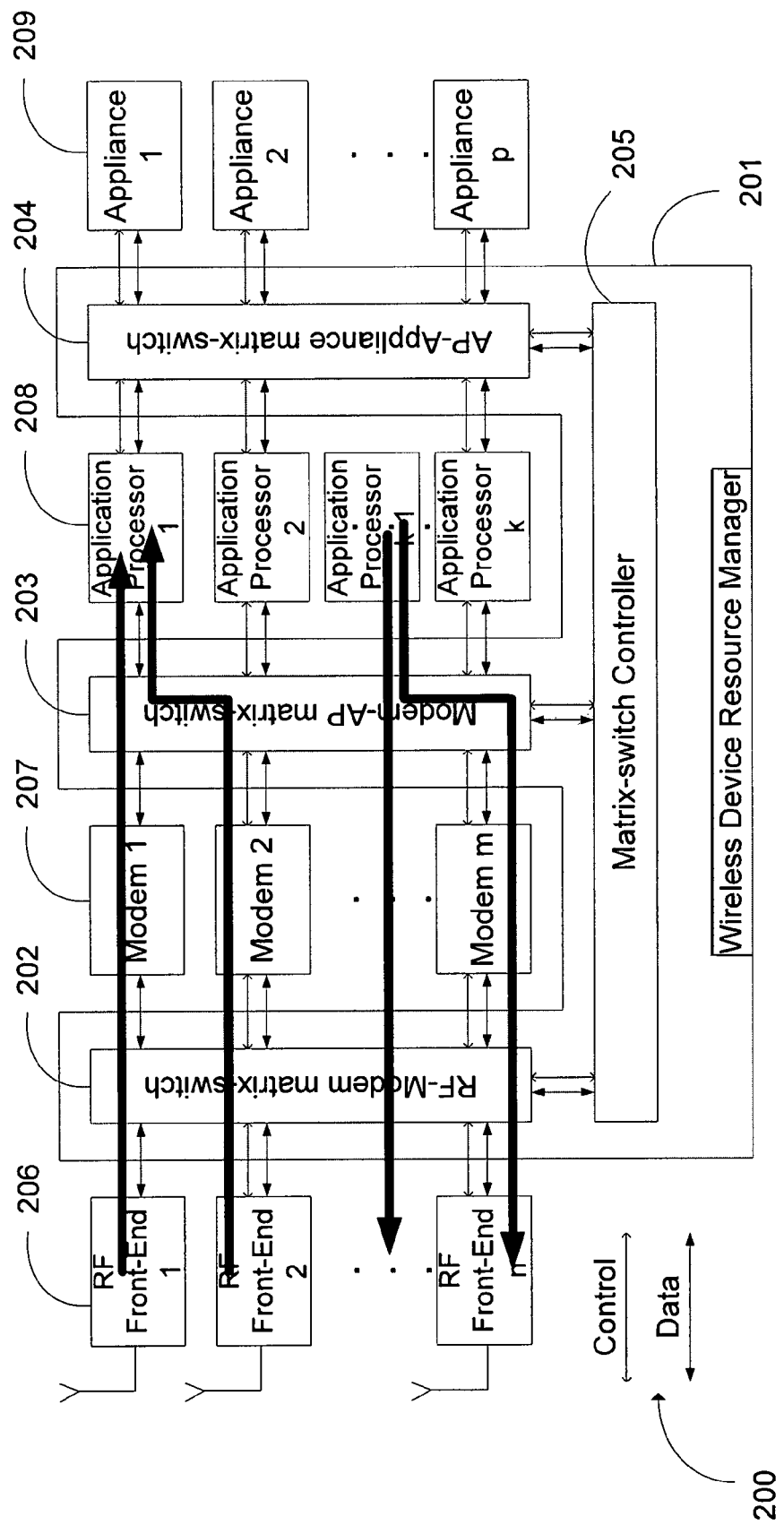
FIG. 10 is a functional block diagram schematically illustrating a wireless device system-architecture, exemplifying implementation of multiple processing routes for aggregation, according to the presently disclosed subject matter.

FIG. 10 is a functional block diagram schematically illustrating a wireless device system-architecture exemplifying implementation of multiple processing routes for aggregation, according to the presently disclosed subject matter. In some cases a single processing route (i.e. communication over a certain communication network such as 3G or Wi-Fi), is not sufficient for data transfer. For example, when a user is watching a video on a wireless device and, while watching, the video quality changes to high definition quality. While a single 3G processing route may have been sufficient for watching a video in regular quality, it may not provide sufficient uploading capacity for watching the video in high-definition quality and therefore more bandwidth is required. The wireless device system disclosed herein is configured (e.g. with the help of controller 205) to identify a need for more bandwidth and, in response, to dynamically change the bandwidth which is provided to a giving application processor. This is done by dynamically adding processing routes for providing the required additional bandwidth. For example, if a 3G channel is used, a Wi-Fi channel can be added for transferring the same data in order to provide the needed bandwidth.

The matrix-switch (e.g. matrix-switch 202) can recognize the need for the additional bandwidth (e.g. by recognizing that the transmission rate is lower than a certain threshold) and provide this information to controller 205. In response controller 205 can be operable to instruct the matrix-switch to connect more processing routes in addition to the ones which are already connected and use the plurality of processing routes (old and new) for transferring the requested information. Alternatively, in some cases a matrix-switch can be operable to add processing routes on its own accord without the intervention of controller 205. Of course as more processing routes contribute to the data-transfer effort of the same data, the available bandwidth is increased.

The matrix-switch (e.g. matrix-switch 203) can be operable to receive the data from the different processing routes and combine the data before it is transferred to the relevant application processor. Or in case it is an outgoing message matrix-switch (e.g. 203) can be operable to split the data and direct part of the data to each of the alternative processing routs. Once the matrix-switch determines that the need for the additional bandwidth is eliminated, it can be configured to eliminate the additional channels as well.

The wireless device system-architecture disclosed herein further enables to increase reliability of data-transfer by utilizing multiple RF front-end and modem combinations. Thus, when the same data can be transferred by more than one data communication network, a number of processing routes can be established by controller 205 and/or the matrix-switch. This enables to increase reliability such that if one processing route, which is connected to one network, fails or is characterized by low QOS the data can be transferred by at least one other processing routes which is connected.

Furthermore, the wireless device system-architecture disclosed herein provides a platform for a dynamic wireless device resource allocation management. For example, antennas can be dynamically allocated to modems, (such as in a MIMO application) based on the required capacity in a given channel during a given time. The allocation of resources can thus be adapted to the current requirement and can be dynamically adapted to any changes in these requirements over time. Controller 205 and/or matrix-switch identify the required capacity and change the connection between the function layers in order to provide the needed resources (e.g. connect more antennas or less antenna to a given modem based on the capacity requirements, at a given moment, in the channel associated with that modem).

Figure 19:
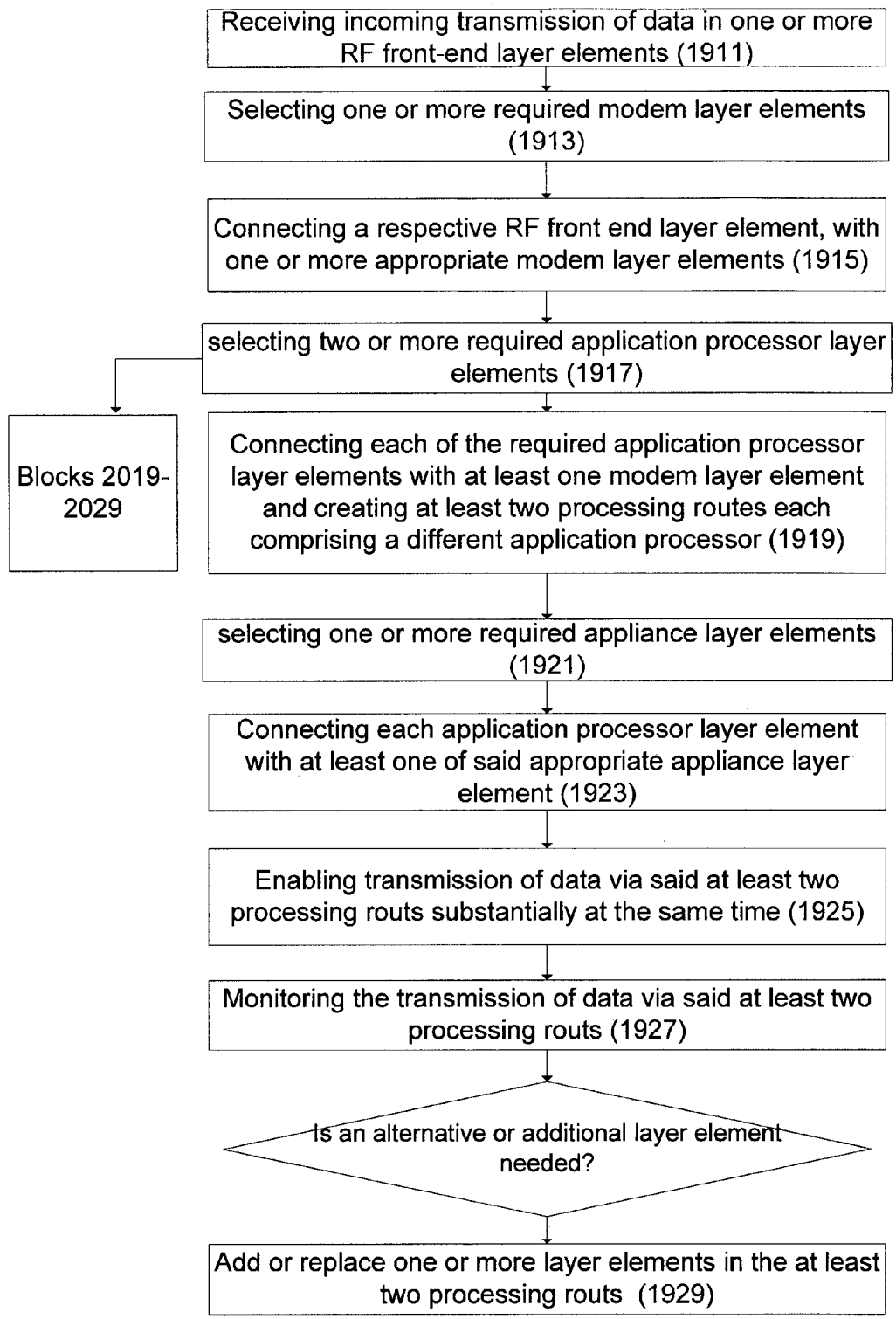
FIG. 19 is a flowchart illustrating a sequence of operations performed, in accordance with the presently disclosed subject matter.

FIG. 19 is a flowchart illustrating a sequence of operations performed, in accordance with the presently disclosed subject matter. FIG. 19 demonstrates the operations involved in parallel transmission of data via two different application processors each associated with a different processing route. This scenario is exemplified above in detail with reference to FIG. 2 and FIG. 3a.

As explained above, incoming data transmission can be received by one or more RF front-end elements (block 1911). The number and type of receiving RF front-end elements may vary depending on different parameters. Such parameters include for example one or more of the following: the characteristics of the data and the characteristics of the data transfer protocol, a required downloading rate, a required quality of service, etc.

A required one or more modem layer elements are selected for further transmitting and processing the incoming data, which is received at a RF front-end element (block 1913). Similar to the RF front-end layer elements, the type and number of the required modem elements is determined based on different parameters which include for example, the parameters listed above with reference to block 1911. As previously explained, the selection of the required modem layer elements, as well as application processor and appliance elements, can be accomplished with the help of the respective matrix-switch and controller 205.

After the required modem elements are selected, a respective RF front-end element can be connected to the selected one or more modems (block 1915). In case a single RF front-end element receives different types of data, each requiring a different type of modem layer element, an RF front-end element can be connected to more than one modem element each configured for transmitted and processing a different type of data. In case multiple RF front-end elements each receive data transmission of a different type (e.g. 3G and WiFi), each RF front-end element can be connected to a different modem layer element. In other cases where multiple RF front-end elements receive the same type of data, two or more RF front-end elements can be connected to the same modem layer element. In all of these cases multiple connections between the RF front-end layer and the modem layer can be created, thereby initiating multiple parallel processing routes.

In some cases once the connection between two different functional layers (in this case RF front-end layer and modem layer) is established, data is immediately transmitted between the two layers. In other cases, transmission of data commences after the entire processing route is constructed.

In block 1917 two or more application processor elements are selected for further transmitting and processing the data. As explained in detail above, the teaching disclosed herein enables data transmission via parallel processing routes, where each processing route comprises a different combination of layer elements. The incoming data can be transmitted and processed in the different processing routes substantially at the same time. As further explained above, multiple application-processor elements can be selected and used in different processing routes in a variety of scenarios. For example, when two different types of data are initially received by RF front-end layer and each type of data requires a different application processor element for its processing, or when a number of application processors of the same type are used for backup purposes or for increasing the processing speed.

Each of the selected application processors are connected to at least one modem element thus establishing at least two processing routes, each comprising a different application processor (block 1919).

In some cases, a single modem can be connected to two or more application processors, while in other cases different modems can be connected to a different application processor. In both of these scenarios, the connection between the two or more application processors, and the one or more modems initiate multiple processing routes (or continue two or more processing routes, in case they have already been initiated), each comprising at least one application processor, through which data can be transmitted substantially at the same time.

Figure 20:
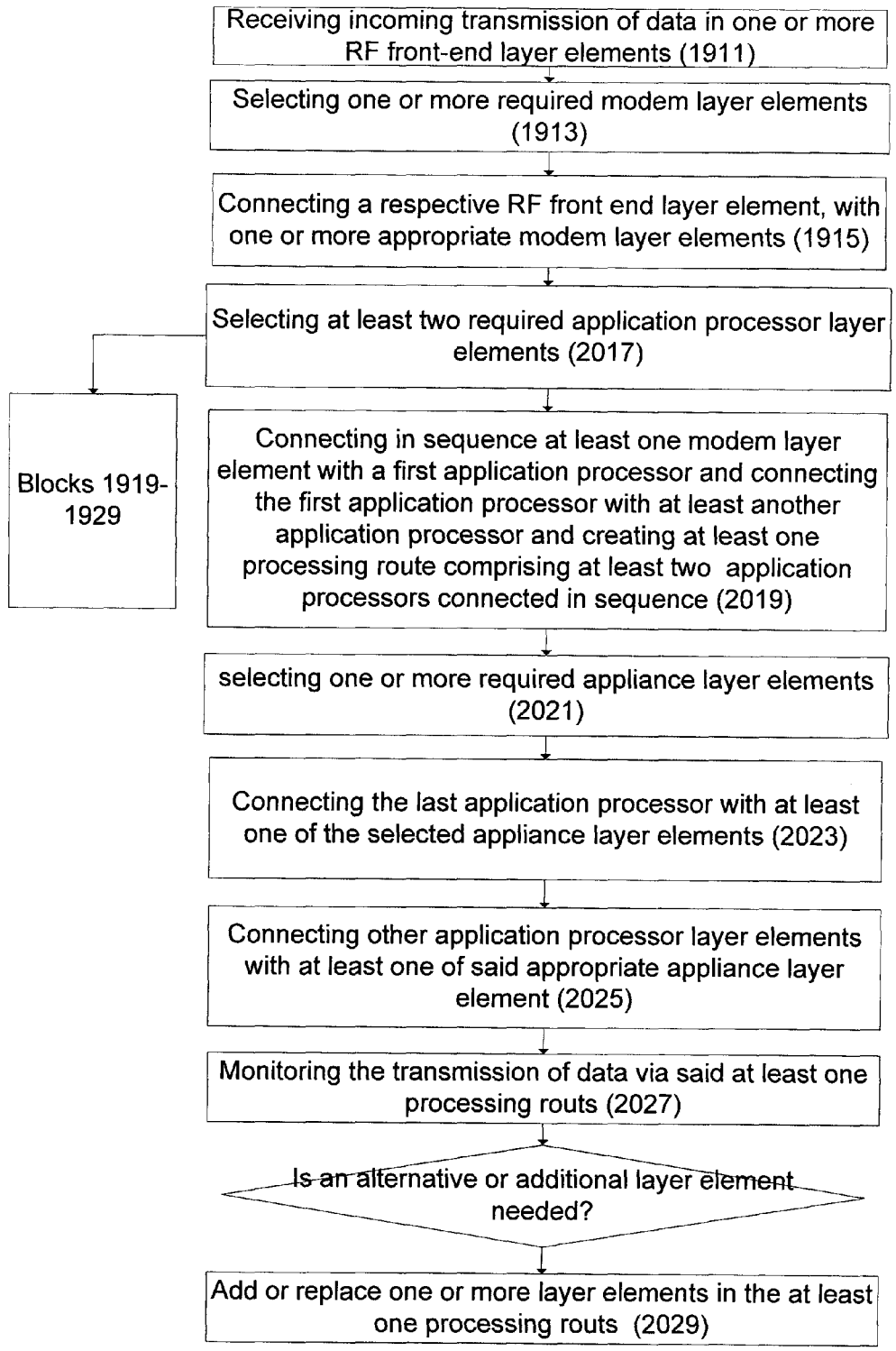
FIG. 20 is a flowchart illustrating a sequence of operations performed, in accordance with the presently disclosed subject matter.

Optionally, at least one processing route comprises two or more application processor elements, which are connected in series. The description below provided with reference to FIG. 20 discloses the operations related to the connection of two or more application processors in a sequence, in a single processing route. Optionally, the operations disclosed by FIG. 19 and FIG. 20 are combined in a single process.

Similar to the operations described above with reference to block 1913 and block 1917 one or more required appliance layer elements are selected (block 1921). In case the data which is being processed by both application processors requires the same appliance (e.g. it is voice data which is directed to a speaker), both application processors can be connected to the same appliance. In case the data which is being processed by each application processor requires a different appliance (e.g. one application processor received voice data directed to a speaker and the other received SMS data directed to the screen), each application processor can be connected to a different required appliance.

Once two or more processing routes are established, the processing routes can be facilitated for transmission of data from a functional layer at one end of a processing route to a functional layer at the other end of the same processing route (block 1925).

As mentioned above, the transmitted data can be continuously monitored by the different matrix-switches and controller 205 (block 1927) and in case a change in the characteristics of the transmitted data, which merits a change in the configuration of the processing routes, is identified, different layer elements can be selected and used in the processing route instead or in additional to the previously selected layer elements (block 1929).

FIG. 20 is a flowchart illustrating a sequence of operations performed, in accordance with the presently disclosed subject matter. FIG. 20 demonstrates the operations involved in serial transmission of data via two different application processors both connected in sequence and associated with the same processing route. This scenario is exemplified in detail above with reference to FIG. 3*b* and FIG. 4.

Blocks 2011 to 2015 comprise the same operations described above with reference to blocks 1911 to 1915 in FIG. 19 and therefore are not explained here in detail. At block 2017 two or more application processor layer elements are selected.

Once the required application processors are selected, at least one of the modem layer elements, which was selected earlier, is connected to the two application processors (block 2019). The different layer elements are connected in sequence, such that at least one modem layer element is connected to a first application processor and the first application processor is connected to at least a second application processor thus creating at least one processing route comprising at least two application processors connected in sequence. Of course, more that two application processors can be connected in series. The reader is invited to refer to the description provided above in respect to FIG. 3 and FIG. 4 for a more detailed description.

Optionally, in addition to connecting at least two application processors in series in a single processing route, one or more additional processing routes can be created to enable transmission of data through two or more parallel application processors, substantially at the same time, as described above with reference to FIG. 19. For example, one processing route can comprise two processing routes connected in series and another processing route can comprise a third application processor. Data can be transmitted through both processing units substantially at the same time.

Similar to the operations described above with reference to block 1921 in FIG. 19 one or more required appliance layer elements are selected (block 2021). The last (e.g. second) application processor element at the end of the sequence of application processors is connected to the selected appliance layer elements (block 2023). In some cases, other application processors, in additional to the last application processor can be connected to an appliance and thereby create additional processing routes. Blocks 2027 to 2029 represent similar operations to those described with reference to blocks 1927 to 1929.

For the sake of simplicity and clarity, the operations described with reference to FIG. 19 and FIG. 20, refer to establishing processing routes for incoming data from the RF front-end layer towards the appliance layer. However, this should not be construed as limiting and as apparent from the entire specification and exemplified above, the same principles which are applied for establishing processing routes in one direction can be used in a similar manner for establishing processing routes in the opposite direction, from the appliance layer to the RF front-end layer.

Figure 21:
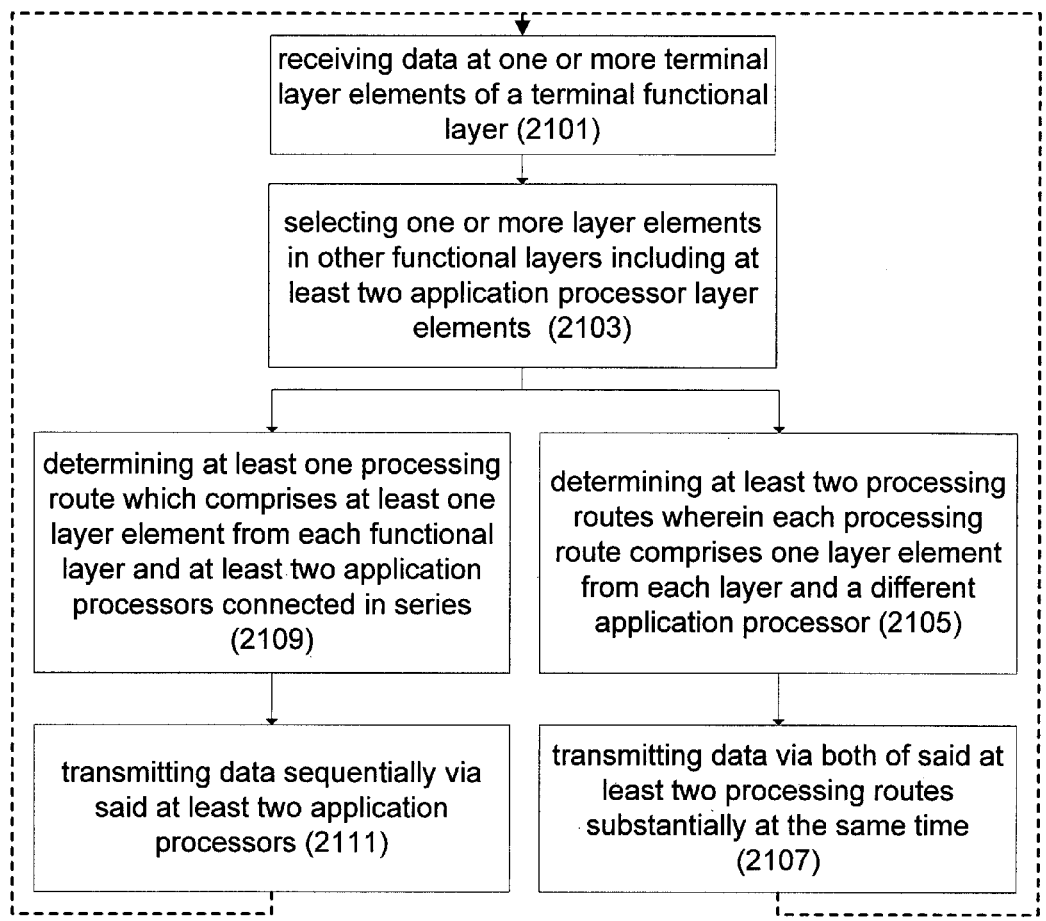
FIG. 21 is a flowchart illustration a general view of operations performed in accordance with the presently disclosed subject matter.

FIG. 21 is a flowchart illustrating a general view of the operation performed in accordance with the presently disclosed subject matter. At block 2101 data transmission is received in one or more terminal layer elements of a terminal functional layer. The terms "terminal functional layer" and "terminal layer element" refer to the layer and its respective elements which are located at either end of the cascade of functional layers. As explained above, such functional layers can include an RF front end layer and the appliance layer.

As exemplified above with reference to FIG. 19 and FIG. 20 data can be received in one or more RF front-end layer elements. As further exemplified above, data can also be received via an appliance such as a keyboard, a camera or a speaker associated with the appliance functional layer.

Based the type of information which is received and other characteristics and settings, one or more layer elements are selected in each layer for establishing a processing route and enabling the transmission and processing of the received data (block 2103). At block 2105 the selected layer elements are connected into at least two processing routes, where each processing route comprises at least one layer element from each layer and a different application processor. The received data can be transmitted via both of said at least two processing routes substantially at the same time (block 2107).

Alternatively or additionally to the operations specified with reference to block 2105 and 2107, at block 2109 at least one processing route which comprises at least one layer element from each functional layer and at least two application processors connected in series, is created. Data can be transmitted via said processing route such that it is transferred sequentially via said at least two application processors (2111). For example, data can be transmitted through two parallel processing routes each associated with a different application processor, while one of the processing routes contains a third application processor which is connected in series to the other application processor.

The process described with reference to FIG. 21 (and FIGS. 19 and 20) is a dynamic process which can continue after the processing routes are created. The processing routes which were created are monitored, and in case additional or different functional elements are needed, new functional elements can be added to the processing routes and old functional elements can be removed from the processing routes. In case data transfer is terminated, or a different type of data is received which requires different processing routes, old processing routes can be disassembled.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A wireless device, comprising:
a plurality of functional layers each of said functional layers comprising one or more respective layer elements, wherein said functional layers include at least an application processor functional layer and at least two other functional layers;
two or more matrix-switches, each matrix-switch operable to connect between a pair of functional layers from said plurality of functional layers, in order to generate one or more processing routes, each processing route connecting said plurality of functional layers in a cascade of functional layers to enable transmission of data between said plurality of functional layers;
a matrix-switch controller operatively connected to said two or more matrix-switches and operable to:
determine, based on information in respect of transmitted data, a required combination of one or more connections for each of said matrix-switches; each connection, connecting between one or more layer element in a first functional layer of a respective pair of functional and one or more layer element in a second functional layer of the respective pair of functional layers; and
instruct said two or more matrix-switches to execute said connections and thereby create said one or more processing routes for transmitting said data.

2. The wireless device of claim 1 wherein said one or more processing routes include at least two processing routes; each of said at least two processing routes is associated with a different application processor layer element and wherein data is being transmitted via said at least two processing routes, in the same direction, substantially at the same time.

3. The wirelesses device of claim 1 wherein said matrix-switch controller is distributed over one or more of said matrix-switches.

4. The wireless device of claim 1 wherein said matrix-switch controller is distributed over one or more application processors.

5. The wireless device of claim 1 wherein at least one of said matrix-switches comprises a management module operable to determine a specific combination of connections between a layer element in one functional layer and one or more layer elements of an adjacent functional layer.

6. The wireless device of claim 1, wherein said matrix-switch controller is further operable to determine in at least one processing route a layer element which is connected in series to at least one other layer element of the same functional layer.

7. The wireless device of claim 6 wherein said functional layer is an application processor functional layer.

8. The wireless device of claim 1 wherein said matrix-switch controller is operable to determine two or more processing routes such that layer elements in each of said two or more processing routes are mutually exclusive.

9. The wireless device of claim 1 wherein said functional layers further comprise one or more of: an RF front-end layer, a modem layer and an appliance layer.

10. The wireless device of claim 1 wherein said at least two other matrix-switches include one or more of: a matrix-switch connecting between an RF front-end layer and a modem layer, a matrix-switch connecting between said modem layer and said application processor layer, and a matrix-switch connecting between said application processor layer and an appliance layer.

11. The wireless device of claim 1 wherein said matrix-switch controller is operable to determine the processing route based on information extracted from any subset of said functional layers.

12. The wireless device of claim 1 wherein said information in respect of said data includes one or more of: communication protocol, data transmission rate, quality of service, data sensitivity.

13. The wireless device of claim 1 wherein said matrix-switch controller is further operable to identify, during transmission of data via one of said one or more processing routes, a need to replace or add a layer element in said processing route and to instruct a respective matrix-switch to replace or add the layer element.

14. The wireless device of claim 13 wherein said layer element is an application processor.

15. The wireless device of claim 1 being a mobile phone.

16. The wireless device of claim 1 being operable according to at least one of a group of communication standards including: 2G; 3G; 4G; WiF; WiMax; BlueTooth; and NFC.

17. The wireless device of claim 1 wherein one or more of said two or more matrix-switches comprises a synchronizer operable to synchronize the transmission of data from one functional layer element to one or more other functional layer elements.

18. The wireless device of claim 17 wherein said two or more matrix-switches further comprises a data-repository and framer;
said data-repository is configured to temporarily store transmitted data and said framer is configured to group the stored data into groups of data; said synchronizer is configured to synchronize the transmission of said groups of data.

19. The wireless device of claim 1 wherein one or more of said two or more matrix-switches comprises a protocol hub module configured to adapt data communication in a given communication protocol for transmission to multiple functional layer elements substantially at the same time.

20. The wireless device of claim 19 wherein said protocol hub is an AT-command hub.

21. A wireless device, comprising:
a plurality of functional layers each of said functional layers comprising one or more respective layer elements, wherein said functional layers include at least an application processor functional layer and wherein said application processor functional layer comprises a plurality layer elements;
one or more matrix-switches, each matrix-switch operable to connect between a pair of functional layers and facilitate the connection of said plurality of functional layers in a cascade of functional layers to enable data-transfer from one functional layer to one or more other functional layers;
a switch matrix matrix-switch controller operatively connected to said one or more matrix-switches;
said matrix-switch controller is operable to control said one or more matrix-switches and determine at least one processing route for data-transfer from at least one layer element in one functional layer, to at least one layer element in a second functional layer, wherein said at least one processing route connects in series at least two layer elements of the same functional layers.

22. The wireless device of claim 21 wherein said functional layer is an application processor functional layer.

23. The wireless device of claim 21, wherein said matrix-switch controller is operable to determine at least two processing routes for data-transfer from at least one layer element in one functional layer, to at least one layer element in a second functional layer, wherein each of said at least two processing routes is associated with a different application processor layer element and wherein data is being transmitted via said at least two processing routes, in the same direction, substantially at the same time.

24. A wireless device resource manager unit being operatively connectable to a wireless device, the device comprising a plurality of functional layers each of said functional layers comprising one or more respective layer elements, wherein said functional layers include at least an application processor functional layer and at least two other functional layers;
the wireless device resource manager unit comprising:
two or more matrix-switches, each matrix-switch operable to connect between a pair of functional layers from said plurality of functional layers, in order to generate one or more processing routes, each processing route connecting said plurality of functional layers in a cascade of functional layers to enable transmission of data between said plurality of functional layers;
a matrix-switch controller operatively connected to said two or more matrix-switches and operable to:
determine, based on information in respect of transmitted data, a required combination of one or more connections for each of said matrix-switches; each connection, connecting between one or more layer element in a first functional layer of a respective pair of functional and one or more layer element in a second functional layer of the respective pair of functional layers; and
instruct said two or more matrix-switches to execute said connections and thereby create said one or more processing routes for transmitting said data.

25. The wireless device of claim 24 wherein said one or more processing routes include at least two processing routes; each of said at least two processing routes is associated with a different application processor layer element and wherein data is being transmitted via said at least two processing routes, in the same direction, substantially at the same time.

26. The wireless device of claim 25 wherein said matrix-switch controller is operable to determine in at least one of said at least two processing routes a layer element which is connected in series to at least one other layer element of the same functional layer.

27. The wireless device of claim 26 wherein said same functional layer is an application processor functional layer.

28. The wireless device of 24 wherein said matrix-switch controller is operable to determine two or more processing routes each of said routes connecting a sequence of layer elements which are mutually exclusive in respect of layer elements in other processing routes in the two or more processing routes.

29. A method of transmitting data in a wireless device comprising a plurality of functional layers each of said functional layers comprising one or more respective layer elements, wherein said functional layers include at least an application processor functional layer and at least two other functional layers; two or more matrix-switches, each matrix-switch operable to connect between a pair of said functional layers; the method comprising:
receiving data at one or more terminal layer elements in a terminal functional layer;
determining, based on information in respect of received data, a required combination of one or more connections for each of said matrix-switches; each connection, connecting between one or more layer element in a first functional layer of a respective pair of functional and one or more layer element in a second functional layer of the respective pair of functional layers; and connecting said combination of connections.

30. The method of claim 29 wherein the terminal layer being an RF front-end layer and the data is incoming data.

31. The method of claim 29 wherein the terminal layer being an appliance layer and the data is outgoing data.

32. The method of claim 29 further comprising:
determining at least one processing route which comprises at least two application processes connected in series.

33. The method of claim 29 wherein selection of one or more layer elements is performed based on information received by said terminal layer element.

34. The method of claim 33 wherein said information includes type of communication protocol, data transmission rate, required quality of service, data sensitivity.

35. A method of transmitting data in a wireless device comprising a plurality of functional layers each of said functional layers comprising one or more respective layer elements, wherein said functional layers include at least an application processor functional layer comprising a plurality of layer elements;
the method comprising:
receiving data at one or more terminal layer elements in a terminal functional layer;
selecting one or more layer elements in other functional layers including at least two application processor layer elements in said application processor layer;
determining at least one processing route which comprises at least one layer element from each functional layer and at least two application processors connected in series.

* * * * *